United States Patent
Homma

(10) Patent No.: US 12,204,237 B2
(45) Date of Patent: Jan. 21, 2025

(54) IMAGE DISPLAY APPARATUS AND IMAGE DISPLAY UNIT

(71) Applicant: Sony Group Corporation, Tokyo (JP)

(72) Inventor: Keisuke Homma, Tokyo (JP)

(73) Assignee: Sony Group Corporation, Tokyo (JP)

( * ) Notice: Subject to any disclaimer, the term of this patent is extended or adjusted under 35 U.S.C. 154(b) by 458 days.

(21) Appl. No.: 17/604,842

(22) PCT Filed: Mar. 26, 2020

(86) PCT No.: PCT/JP2020/013632
§ 371 (c)(1),
(2) Date: Oct. 19, 2021

(87) PCT Pub. No.: WO2020/235216
PCT Pub. Date: Nov. 26, 2020

(65) Prior Publication Data
US 2022/0221778 A1 Jul. 14, 2022

(30) Foreign Application Priority Data
May 23, 2019 (JP) ................................. 2019-096506

(51) Int. Cl.
*G03B 21/20* (2006.01)
*G02B 5/30* (2006.01)

(52) U.S. Cl.
CPC ....... *G03B 21/2073* (2013.01); *G02B 5/3025* (2013.01); *G02B 5/3083* (2013.01)

(58) Field of Classification Search
CPC .............. G03B 21/2073; G02B 5/3025; G02B 5/3083; G02B 27/28; G02B 27/286; G02B 27/48; G02F 1/13
See application file for complete search history.

(56) References Cited

U.S. PATENT DOCUMENTS

| 2007/0139620 A1 | 6/2007 | Bruzzone |
| 2011/0019153 A1 | 1/2011 | Lee et al. |

(Continued)

FOREIGN PATENT DOCUMENTS

| CN | 106104376 A | 11/2016 | |
| CN | 107976821 A * | 5/2018 | ........... G02B 27/286 |

(Continued)

OTHER PUBLICATIONS

International Search Report issued in International Patent Application No. PCT/JP2020/013632 on Jun. 9, 2020 and English translation of same. 5 pages.

(Continued)

*Primary Examiner* — Magda Cruz
(74) *Attorney, Agent, or Firm* — K&L Gates LLP

(57) ABSTRACT

An image display apparatus according to an embodiment of the present technology includes: a light emission unit; and a polarization conversion element. The light emission unit emits image light. The polarization conversion element has an incident surface, converts a polarization state of the image light that enters the incident surface, emits the converted light as image light in an unpolarized state, and is configured such that conversion properties of the polarization state are non-uniform in the incident surface. As a result, it is possible to sufficiently depolarize the image light and display a high-quality image. In addition, it is possible to reduce uneven polarization and speckles.

20 Claims, 18 Drawing Sheets

(56) References Cited

U.S. PATENT DOCUMENTS

| | | | |
|---|---|---|---|
| 2013/0063701 A1* | 3/2013 | Ouderkirk | H04N 9/3167 |
| | | | 359/489.08 |
| 2013/0135590 A1* | 5/2013 | Homma | G02B 27/283 |
| | | | 353/20 |
| 2014/0063466 A1* | 3/2014 | Homma | G03B 21/2073 |
| | | | 353/20 |
| 2021/0116797 A1* | 4/2021 | Homma | G02B 27/149 |

FOREIGN PATENT DOCUMENTS

| JP | 2006-058588 A | | 3/2006 | |
|---|---|---|---|---|
| JP | 2013-113984 A | | 6/2013 | |
| JP | 2014119472 A | * | 6/2014 | ............ G03B 21/14 |
| JP | 2016-164665 A | | 9/2016 | |
| JP | 2018-092032 A | | 6/2018 | |

OTHER PUBLICATIONS

Written Opinion issued in International Patent Application No. PCT/JP2020/013632 on Jun. 9, 2020. 4 pages.

* cited by examiner

A

B

IMAGE DISPLAY APPARATUS AND IMAGE DISPLAY UNIT

TECHNICAL FIELD

The present technology relates to an image display apparatus and an image display unit.

BACKGROUND ART

In the past, an image display apparatus such as a projector has been widely used. In a projection apparatus described in Patent Literature 1, a polarization conversion unit capable of uniformly and omnidirectionally depolarizing projected lights of all RGB is disposed between an emitting side of combined light of a color combination prism and an incident side of a projection lens. This makes it possible to completely eliminate color unevenness of a 3D image with 3D glasses not tilted and to eliminate the color unevenness and a luminance drop of the 3D image with the 3D glasses tilted. As a result, it is possible to significantly improve 3D image quality (see Patent Literature 1, specification paragraphs [0154] and [0155], FIG. 20, etc.).

CITATION LIST

Patent Literature

Patent Literature 1: Japanese Patent Application Laid-open No. 2013-113984

DISCLOSURE OF INVENTION

Technical Problem

Thus, there is a need for a technology capable of displaying a high-quality image.

In view of the above circumstances, an object of the present technology is to provide an image display apparatus and an image display unit that are capable of displaying a high-quality image.

Solution to Problem

In order to achieve the above-mentioned object, an image display apparatus according to an embodiment of the present technology includes: a light emission unit; and a polarization conversion element.

The light emission unit emits image light.

The polarization conversion element has an incident surface, converts a polarization state of the image light that enters the incident surface, emits the converted light as image light in an unpolarized state, and is configured such that conversion properties of the polarization state are non-uniform in the incident surface.

In this image display apparatus, a polarization conversion element that converts a conversion state of image light and emits the converted light as image light in an unpolarized state is provided. The polarization conversion element is configured such that conversion properties of the polarization state are non-uniform in the incident surface. As a result, it is possible to sufficiently depolarize the image light and display a high-quality image.

The polarization conversion element may add a phase difference to the image light that enters the incident surface and may be configured such that the phase difference added to the image light is non-uniform in the incident surface.

The polarization conversion element may be configured such that a birefringence with respect to the image light is non-uniform in the incident surface.

The polarization conversion element may have an emission surface that emits the image light in the unpolarized state and may be configured such that a thickness from the incident surface to the emission surface in an optical axis direction of the image light is non-uniform in the incident surface.

The polarization conversion element may be configured such that conversion properties of the polarization state change in a continuous manner along a predetermined direction in the incident surface.

The emission surface may be tilted along a predetermined direction with respect to the incident surface.

The predetermined direction may be a direction corresponding to an up-and-down direction or a right-and-left direction of an image formed by the image light.

The polarization conversion element may be configured such that a difference between a minimum phase difference and a maximum phase difference added to the image light is equal to or larger than ¼ of a reference wavelength of the image light.

The reference wavelength may be a wavelength included in a blue wavelength band.

The image display apparatus may further include a suppression member that has a suppression incident surface and a suppression emission surface, the image light in the unpolarized state emitted from the polarization conversion element entering the suppression incident surface, the suppression emission surface emitting the image light in the unpolarized state that enters the suppression incident surface. In this case, the suppression member may be configured to be capable of emitting the image light from the suppression emission surface while suppressing a variation in an optical distance of the image light from the incident surface to the emission surface of the polarization conversion element.

The polarization conversion element may have an emission surface that emits the image light in the unpolarized state. In this case, the suppression member is disposed such that the suppression incident surface comes into contact with the emission surface. Alternatively, the suppression member may be disposed such that the suppression incident surface is close to the emission surface in parallel.

The suppression member may be disposed such that the suppression emission surface is parallel to the incident surface.

The suppression member may be configured such that a distance from the incident surface to the suppression emission surface is uniform in the optical axis direction of the image light.

The suppression member may have a shape equal to that of the polarization conversion element.

The suppression member may be formed of a material having no optical anisotropy.

A refractive index of the suppression member may be specified on the basis of a refractive index of the polarization conversion element.

The polarization conversion element may be formed of a uniaxial crystal material or a uniaxial organic material.

the image display apparatus may further include a projection unit that projects the image light in the unpolarized state emitted from the polarization conversion element. In this case, the light emission unit may include a light modulation element that modulates incident light and emits the image light.

An image display unit according to an embodiment of the present technology includes a polarization conversion element.

The polarization conversion element has an incident surface, converts a polarization state of the image light that enters the incident surface, emits the converted light as image light in an unpolarized state, and is configured such that conversion properties of the polarization state are non-uniform in the incident surface.

The image display unit may further include: a suppression member that has a suppression incident surface and a suppression emission surface, the image light in the unpolarized state emitted from the polarization conversion element entering the suppression incident surface, the suppression emission surface emitting the image light in the unpolarized state that enters the suppression incident surface. In this case, the suppression member may be configured to be capable of emitting the image light from the suppression emission surface while suppressing a variation in an optical distance of the image light from the incident surface to the emission surface of the polarization conversion element.

MODE(S) FOR CARRYING OUT THE INVENTION

Embodiments according to the present technology will now be described below with reference to the drawings.

First Embodiment

[Image Display Apparatus]

Figure 1:
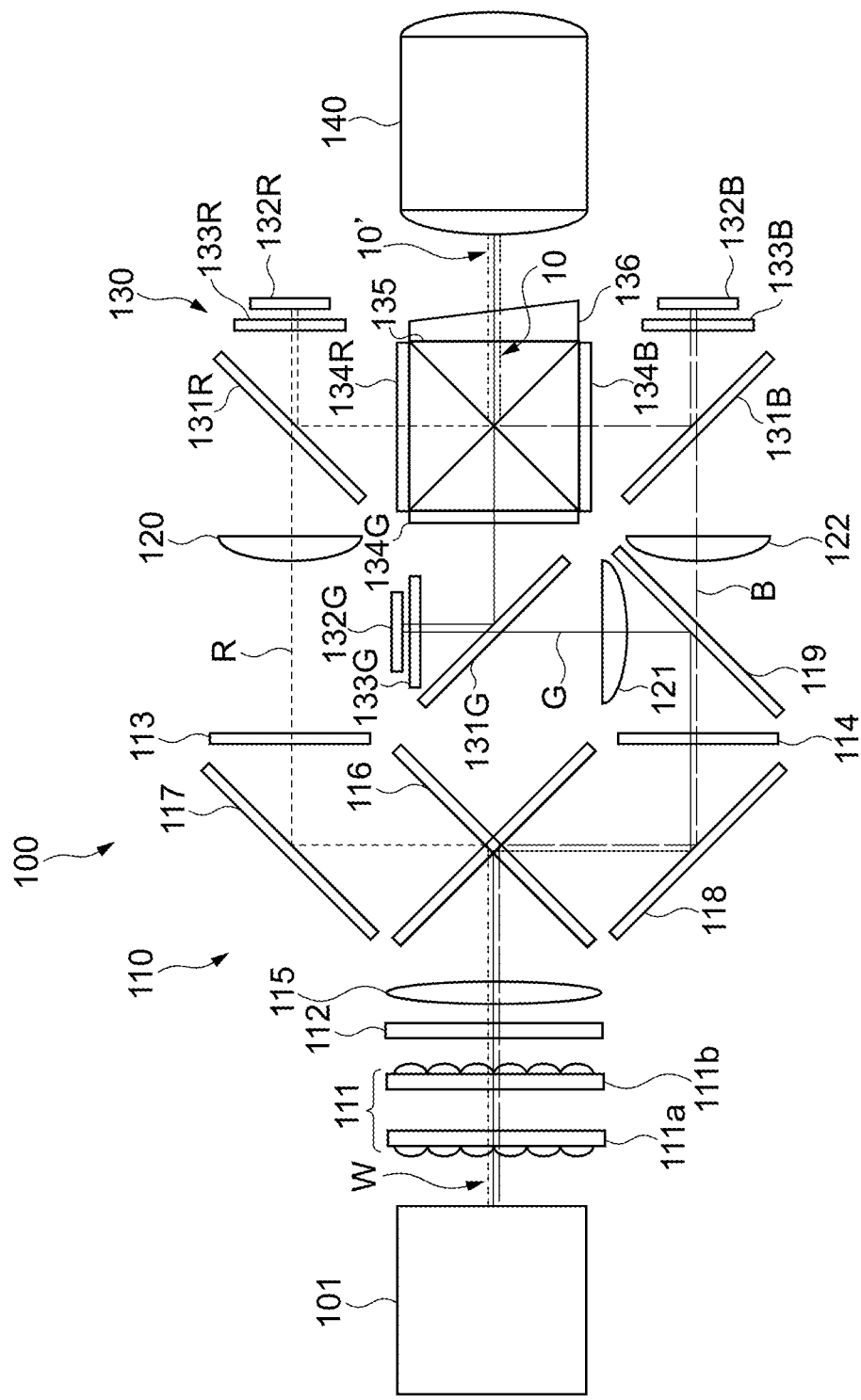
FIG. 1 is a schematic diagram showing a configuration example of an image display apparatus according to a first embodiment.

FIG. 1 is a schematic diagram showing a configuration example of an image display apparatus according to a first embodiment of the present technology. An image display apparatus 100 is used as a projector for, for example, a presentation or a digital cinema. The present technology described below is also applicable to an image display apparatus used for other applications.

The image display apparatus 100 includes a light source unit 101, a lighting optical system 110, an image generation unit 130, and a projection optical system 140.

The light source unit 101 generates white light W and emits the generated white light W to the lighting optical system 110. In the light source unit 101, for example, a solid-state light source such as an LED (Light Emitting Diode) and an LD (Laser Diode), a mercury lamp, a xenon lamp, or the like is disposed.

For example, a solid-state light source for RGB capable of emitting light of each color of RGB may be used, and the emitted light may be combined to generate the white light W. Alternatively, a solid-state light source that emits light in a blue wavelength band, and a phosphor that is excited by the blue light and emits yellow fluorescence may be disposed. In this case, blue light and yellow light are combined to emit the white light W.

The lighting optical system 110 includes an integrator element 111, a polarization conversion element 112, polarization elements 113 and 114, a condenser lens 115, a cross dichroic mirror 116, reflection mirrors 117 and 118, a dichroic mirror 119, and relay lenses 120, 121 and 122.

The integrator element 111 includes first and second fly-eye lenses 111a and 111b. The white light W is transmitted through the first and second fly-eye lenses 111a and 111b, and luminance unevenness of the white light W is reduced.

The polarization conversion element 112 has a function of making the polarization state of the white light W that enters through the integrator element 111 uniform. As the polarization conversion element 112, an arbitrary optical element such as a PS converter may be used. The white light W that has passes through the polarization conversion element 112 is emitted to the cross dichroic mirror 116 through the condenser lens 115.

The cross dichroic mirror 116 splits the white light W emitted from the condenser lens 115 into red light R at a long wavelength side and green light G and blue light B at a short wavelength side. The red light R split by the cross dichroic mirror 116 is reflected by the reflection mirror 117 and enters the polarization element 113. The red light R having the polarization state that has been made uniform by the polarization element 113 is emitted to the image generating section 130 through the relay lens 120. Note that as the polarization element 113, an arbitrary optical element such as a polarizing plate may be used.

The green light G and the blue light B split by the cross dichroic mirror 116 are reflected by the reflection mirror 118 and enter the polarization element 114. The green light G and the blue light B having polarized states that have been made uniform by the polarization element 114 are split into the green light G at the long wavelength side and the blue light B at the short wavelength side by the dichroic mirror 119.

The green light G split by the dichroic mirror 119 is emitted to the image generating section 130 through the relay lens 121. The blue light B split by the dichroic mirror 119 is emitted to the image generation unit 130 through the relay lens 122.

The image generation unit 130 includes a reflective polarization element 131 (131R, 131G, 131B), a reflective light modulation element 132 (132R, 132G, 132B), a wavelength plate 133 (133R, 133G, 133B), and a polarizing plate 134 (134R, 134G, 134B), which are disposed for each color of RGB. Further, the image generation unit 130 includes a color combination prism 135 and a polarization scrambler 136.

The reflective polarization element 131 is a wire grid polarizer. In this embodiment, each light of RGB is emitted from each of the relay lenses 120 to 122 shown in FIG. 1 so as to be P-polarized with respect to an optical plane of the reflective polarization element 131.

The reflective polarization element 131R emits the P-polarized component of the red light R toward the wavelength plate 133R. The wavelength plate 133R functions as a compensation plate for compensating for the flotation of black luminance, rotates a polarization direction of the incident red light R, and emits the red light R to the reflective light modulation element 132R. A rotation angle of the polarization direction is appropriately set such that an image with high accuracy is projected.

The reflective light modulation element 132R modulates and reflects the incident red light R on the basis of an image signal corresponding to the red light R supplied from outside. The modulated red light R is emitted as image light forming a red image (hereinafter, referred to as image light R using the same reference symbol). As the reflective light modulation element 132R, a reflective liquid crystal panel is typically used, but the present technology is not limited thereto.

The image light R emitted from the reflective light modulation element 132R enters the reflective polarization element 131R via the wavelength plate 133R. The S-polarized component of the image light R is reflected by the optical plane and enters the polarizing plate 134R disposed on the optical path of the image light R.

The polarizing plate 134R makes the polarization state of the image light R uniform and cuts unnecessary light. For example, linearly polarized light having a polarization direction parallel to a transmission axis (polarization axis) of the polarizing plate 134R is transmitted through the polarizing plate 134R and is emitted. It goes without saying that the present technology is not limited to such an arrangement configuration. The image light R emitted from the polarizing plate 134R is emitted to the color combination prism 135.

Similarly, the green light G and the blue light B are modulated by the reflective light modulation elements 132G and 132B, and are emitted as image light G forming a green image and image light B forming a blue image. The image lights G and B are reflected by the reflective polarization elements 131G and 131B, and enter the polarizing plates 134G and 134B disposed on the optical paths of the image lights G and B, respectively. For example, the image lights G and B are emitted to the color combination prism 135 as linearly polarized lights each having a polarization direction parallel to the transmission axis of each of the polarizing plates 134G and 134B.

In this embodiment, an inorganic polarizing plate is used as the polarizing plate 134 (134R, 134G, 134B). It goes without saying that the present technology is not limited thereto, and a polarizing plate having an arbitrary structure may be used.

In this embodiment, the reflective light modulation element 132 (132R, 132G, 132B) corresponds to a light modulation element that modulates incident light and emits the image light.

The color combination prism 135 is, for example, formed by bonding a plurality of glass prisms (four right isosceles prisms having substantially identical shapes). Two interference films having predetermined optical properties are formed on a bonding surface of each glass prism. The first interference film of the interference films reflects the blue light B and causes the red light R and the green light G to be transmitted therethrough. The second interference film reflects the red light R and causes the blue light B and the green light G to be transmitted therethrough.

The image lights R and B are reflected by the bonding surface, and the image light G is transmitted through the bonding surface. As a result, images RGB are combined on the same optical path, and image light 10 forming a color image is generated. The image light 10 is emitted to the polarization scrambler 136.

The polarization scrambler 136 converts the polarization state of the incident light and emits the converted light as light in an unpolarized state. In this embodiment, the polarization state of the image light 10 (image lights R, G, B) that has been transmitted through the polarizing plates 134R, 134G, and 134B and combined is converted, and the converted light is emitted as image light 10' in the unpolarized state. In this embodiment, the polarization scrambler 136 functions as a polarization conversion element.

The light in the unpolarized state is light that is not polarized, and includes, for example, natural light. Further, light having polarization directions distributed substantially uniformly in all directions is also included in the light in the unpolarized state. Further, light including lights having various polarization states is also included in the light in the unpolarized state. Further, light including a plurality of lights having polarization components of substantially equal intensity and different polarization directions from each other is also included in the light in the unpolarized state.

Hereinafter, the degree of the unpolarized state will be referred to as the scramble degree in some cases. For example, in the case where two lights having the same wavelength band are emitted, the light including more lights in different polarization states is light having the relatively high scramble degree. It goes without saying that the present technology is not limited to the lights having the same wavelength band. Also in the case where lights having wavelength bands different from each other are compared to each other, the light including more lights in different polarization states is light having the relatively high scramble degree.

The projection optical system 140 enlarges the image light 10' converted into light in the unpolarized state by the polarization scrambler 136 at a predetermined magnification and projects the enlarged light on a projection target such as a screen. Thus, a color image is displayed. The projection optical system 140 includes, for example, a plurality of projection lenses or the like, and a specific configuration thereof may be appropriately designed. In this embodiment, the projection optical system 140 corresponds to a projection unit that projects the image light in the unpolarized state emitted from the polarization conversion element.

By converting the image light 10 into the image light 10' in the unpolarized state, it is possible to prevent color unevenness and a luminance drop due to reflection properties of a projection target such as a screen from occurring. For example, depending on an angle of incidence of the light that enters the projection target and the polarization state, a reflectance of the light differs in some cases. In this case, in the case where there is a difference in the polarization state of each of the image lights of RGB, the reflectance of the light of each color will vary, resulting in the color unevenness and the luminance drop. In this embodiment, since the image light 10 is converted into the image light 10' in the unpolarized state, the reflectances of the lights of the respective colors is substantially equivalent to each other and the color unevenness and the luminance drop are suppressed.

Further, there is a system in which light in a predetermined polarization state is caused to be transmitted by 3D glasses and viewed as a right-eye image and a left-eye image. Even in such a system, by converting the image light 10 into the image light 10' in the unpolarized state, it is possible to sufficiently prevent the color unevenness and the luminance drop from occurring. In addition, even in the case where an image is displayed by an ultra-short focus projector or the like, by applying the present technology, it is possible to sufficiently prevent the color unevenness and the luminance drop from occurring.

In this embodiment, the component that emits the image light 10 toward the polarization scrambler 136 realizes a light emission unit that emits image light. For example, the reflective polarization element 131, the reflective light modulation element 132, the wavelength plates 133 and 134, and the color combination prism 135 realize a light emission unit. The specific configuration of the light emission unit is not limited, and an arbitrary configuration may be employed. Further, only the color combination prism 135 can be regarded as one embodiment of the light emission unit according to the present technology.

Further, in this embodiment, the polarization scrambler 136 realizes an image display unit. The image display unit may be configured to be interchangeable from the image display apparatus 100.

[Example of Generating Image Light 10' in Unpolarized State]

Figure 2:
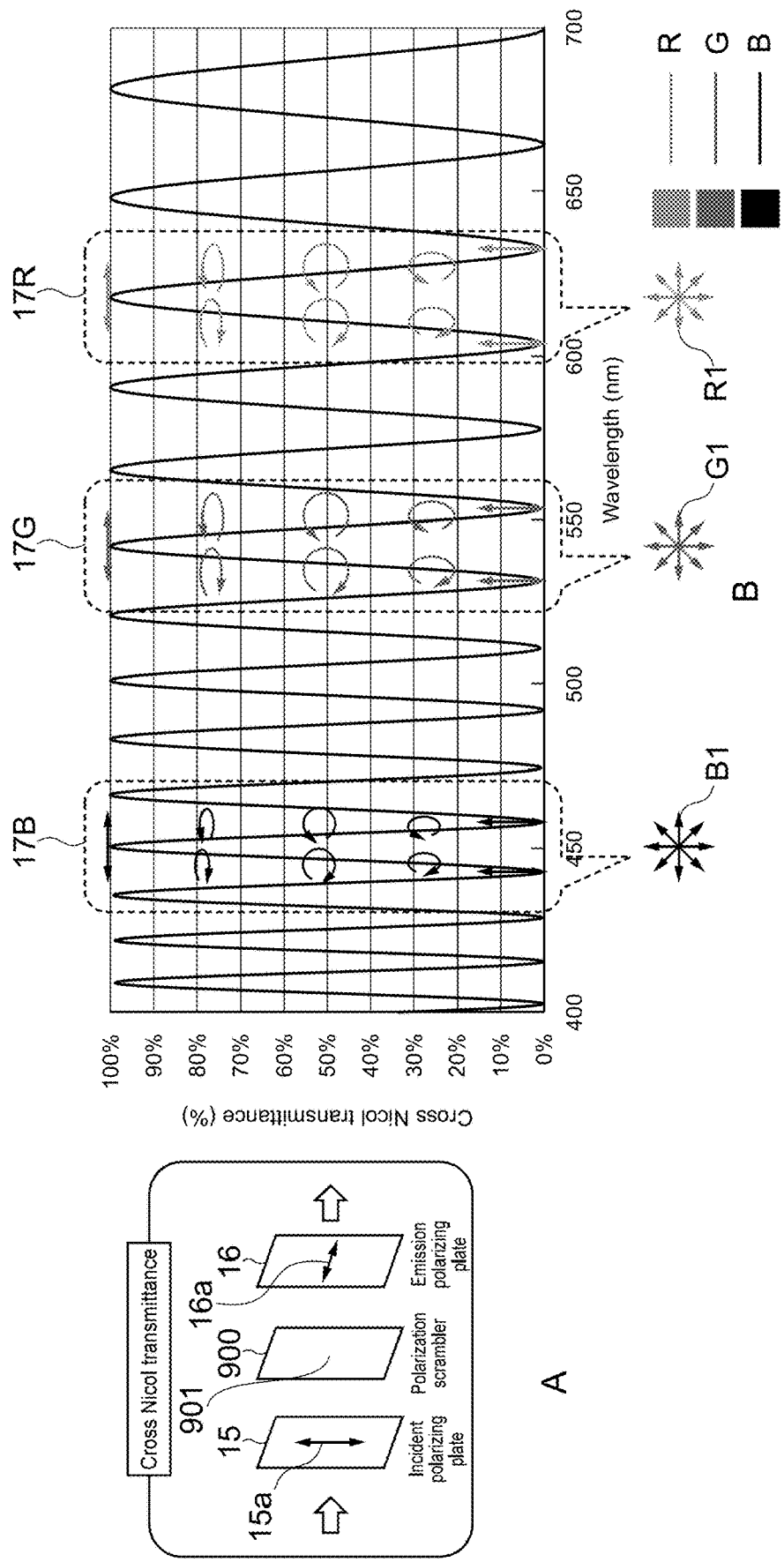
FIG. 2 is a diagram for describing an example of converting a polarization state for generating light in an unpolarized state.

FIG. 2 is a diagram for describing an example of converting a polarization state for generating light in an unpolarized state. Here, in order to facilitate understanding of the present technology, a case where a polarization scrambler 900 different from the polarization scrambler 136 illustrated in FIG. 1 is used will be described.

The polarization scrambler 900 is an element that has an optical axis and is capable of converting the polarization state by adding a phase difference to two polarization components, which are perpendicular to each other, of incident light. For example, it is possible to realize the polarization scrambler 900 by a material having an optical anisotropy. Note that the optical axis corresponds to a slow axis or a fast axis.

The polarization scrambler 900 is configured to have a uniform thickness in the optical axis direction of incident light. By appropriately controlling the thickness of the polarization scrambler 900, it is possible to achieve the polarization property shown in Part B of FIG. 2. This makes it possible to convert the polarization state of incident light such that the polarization state differs for each wavelength of incident light.

For example, when light included in a predetermined wavelength band (light including a plurality of wavelength lights) enters the polarization scrambler 900, light in the unpolarized state including lights in various polarization states can be generated.

Note that the polarization scrambler 900 has the polarization property shown in Part B of FIG. 2 over the entire incident surface 901 that light enters. That is, the polarization scrambler 900 is configured such that the polarization properties are uniform in the incident surface 901. In this embodiment, the polarization properties correspond to conversion properties of the polarization state.

As shown in Part A of FIG. 2, two polarizing plates 15 and 16 are disposed such that their transmission axes 15a and 16a are substantially perpendicular to each other. Then, the polarization scrambler 900 is disposed therebetween, and the Cross-Nicol transmittance for each wavelength has been measured.

As shown in Part B of FIG. 2, the transmittance periodically changes for each wavelength. The change in the transmittance corresponds to the change in the polarization state. For example, wavelength light having a transmittance whose value is close to 0% corresponds to light whose polarization state is not converted by the polarization scrambler 900. Such light is linearly polarized light having a polarization direction parallel to the transmission axis 15a of the polarizing plate 15.

Wavelength light having a transmittance whose value is close to 100% corresponds to light whose polarization direction is caused to rotate by substantially 90 degrees by the polarization scrambler 900. Such light is linearly polarized light having a polarization direction parallel to the transmission axis 16a of the polarizing plate 16.

As schematically shown in Part B of FIG. 2, wavelength light having a transmittance whose value is close to 50% corresponds to light to be converted into circularly polarized light by the polarization scrambler 900. Wavelength light having a transmittance in the range of 0% to 50% corresponds to light to be converted into vertically-long elliptically polarized light (elliptically polarized light having many polarization components parallel to the transmission axis 15a). Wavelength light having a transmittance in the range of 50% to 100% corresponds to light to be converted into horizontally-long elliptically polarized light (elliptically polarized light having many polarization components parallel to the transmission axis 16a).

As described above, the light that has entered the polarization scrambler 900 is converted into light in a polarization state different for each wavelength. For example, a red wavelength band 17R, a green wavelength band 17G, and a blue wavelength band 17B, each of which is surrounded by a dashed line, include lights in various polarization states. As a result, the image lights R, G, B of the respective colors are converted into lights R1, G1, B1 in the unpolarized states by the polarization scrambler 900. Note that the wavelength band of each color is not limited to the wavelength band shown in Part B of FIG. 2.

The polarization scrambler 900 is formed of, for example, a uniaxial crystalline material. It is possible to use an inorganic material having an axis on the material itself, such as quartz, sapphire, lithium niobate, and yttrium vanadate. For example, the polarization scrambler 136 is formed such that the optical axis is other than 0°/90° (45°, 135° is valid)

with respect to the image light 10 without Zcut. It goes without saying that the present technology is not limited thereto.

Further, the polarization scrambler 900 can be formed of, for example, a uniaxial organic material. For example, it is also possible to realize the polarization scrambler by an organic film such as polycarbonate and polyolefin.

In addition, in order to realize the polarization scrambler 900, an arbitrary configuration may be employed. An arbitrary wavelength plate using quartz, a wavelength plate film, an inorganic phase difference film, or the like can be used as the polarization scrambler 900. Note that when the polarization scrambler 900 is formed to have each configuration of a multilayer film, a multilayer inorganic deposition film, and a multilayer quartz, the polarization scrambler 900 having the configuration of a multilayer quartz has higher moisture absorption and resistance to deterioration or the like. In view of this, the polarization scrambler 900 using an inorganic material such as quartz is thought to be valid with respect to an image display apparatus of a high-luminance model. It goes without saying that the application of the present technology is not limited to this material or configuration.

In the present disclosure, the optical operation of adding a phase difference to two polarization components, which are perpendicular to each other, of incident light is represented as adding a phase difference to incident light in some cases. Further, in the present disclosure, an arbitrary optical element capable of adding a phase difference to incident light is included in a phase difference plate. That is, an arbitrary phase difference plate can be used as the polarization scrambler 900.

[Polarization Scrambler 136]

Figure 3:
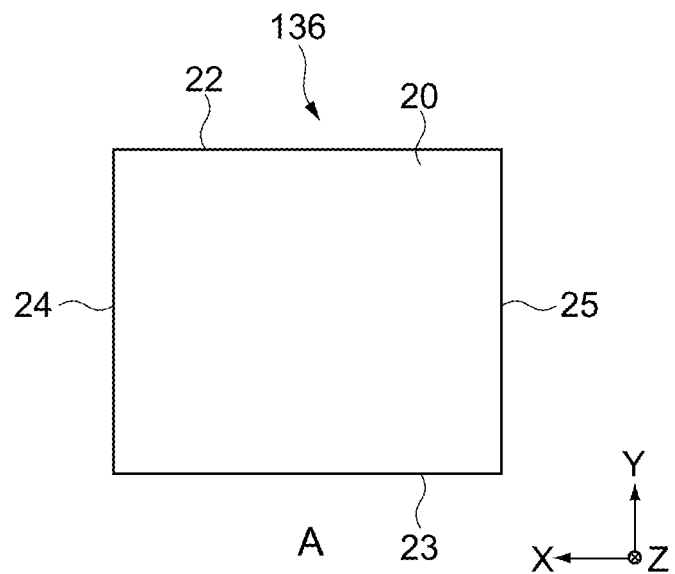
FIG. 3 is a schematic diagram showing a configuration example of a polarization scrambler.
Figure 3:
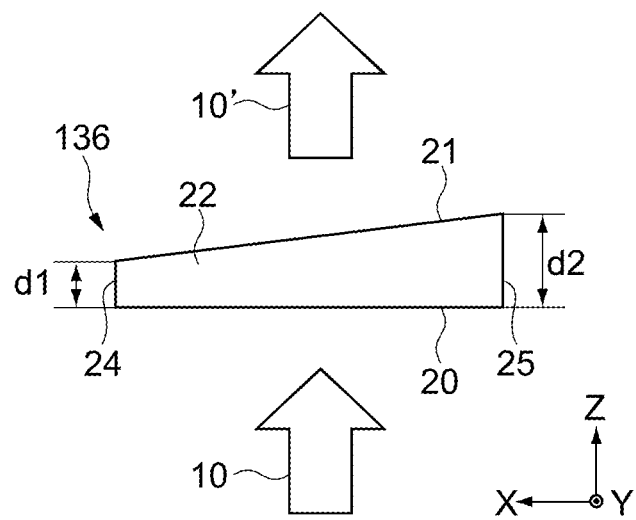
Figure 4:
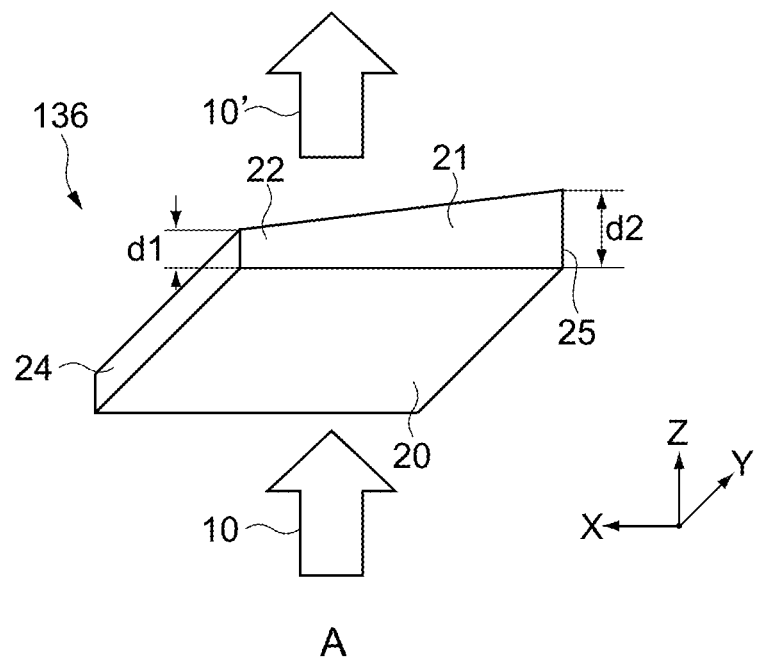
FIG. 4 is a schematic diagram showing a configuration example of the polarization scrambler.
Figure 4:
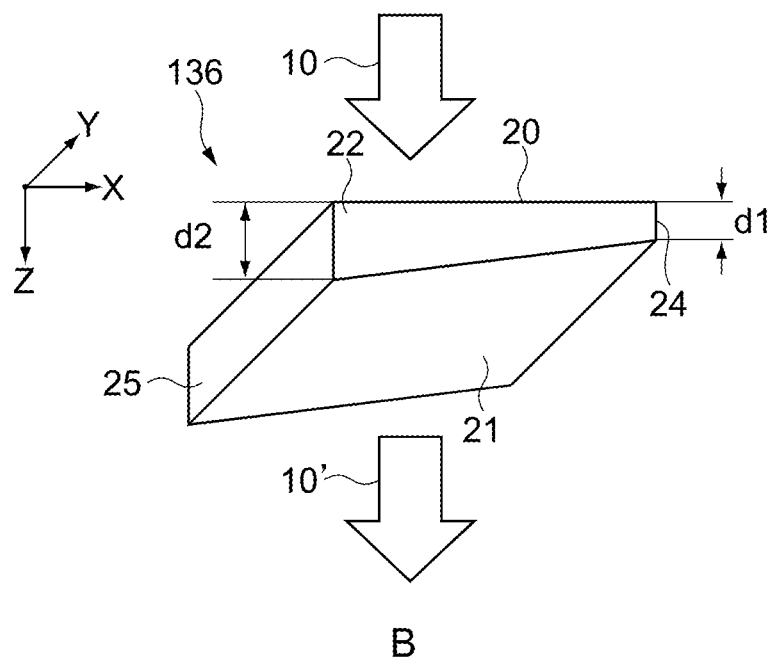
Figure 5:
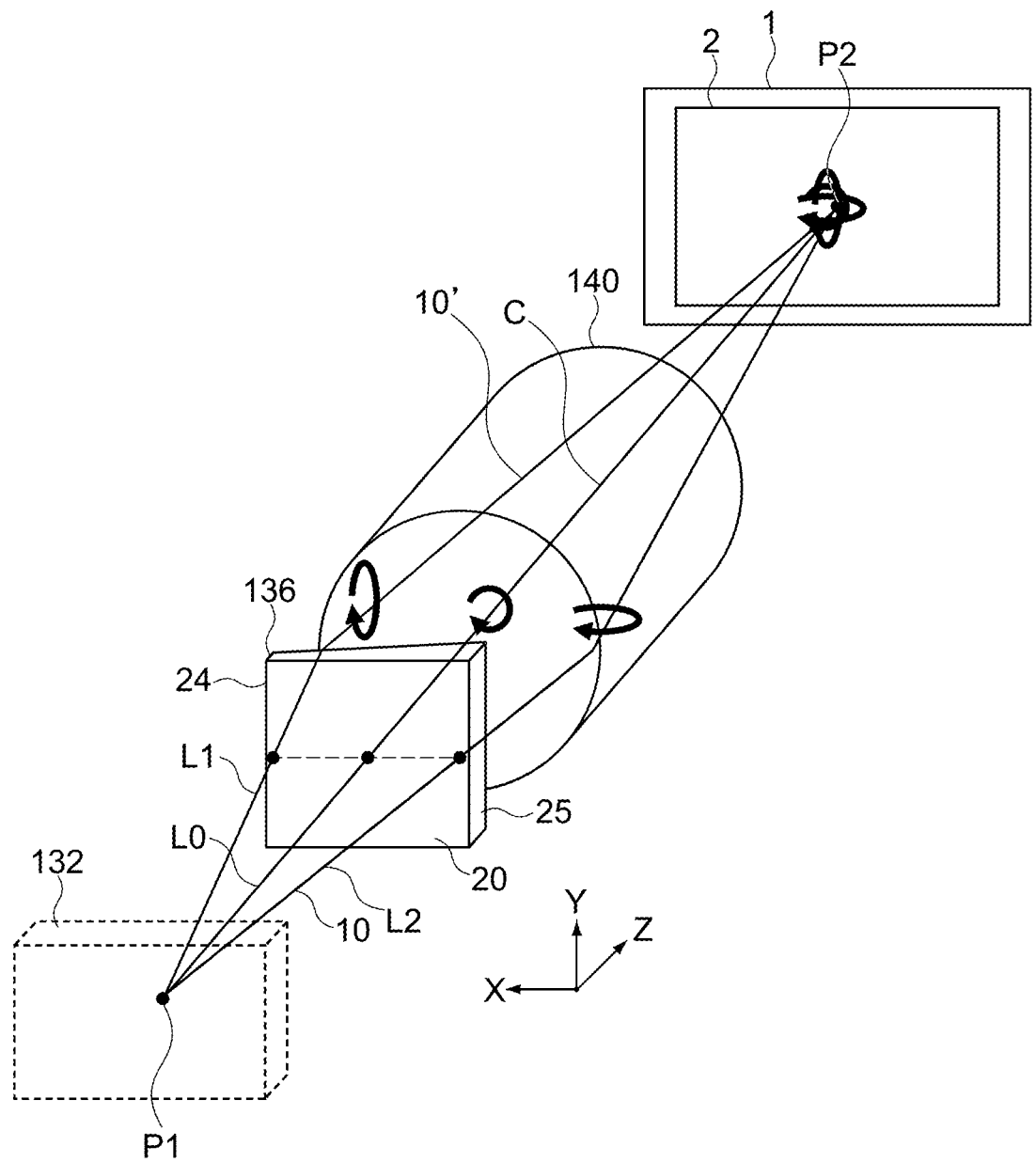
FIG. 5 is a diagram schematically showing image light that travels from a reflective light modulation element to a screen 1.

The polarization scrambler 136 according to this embodiment will be described in detail. FIG. 3 and FIG. 4 are each a schematic diagram showing a configuration example of the polarization scrambler 136. FIG. 5 is a diagram schematically showing the image light 10 (10') that travels from the reflective light modulation element 132 to the screen 1.

In FIG. 5, in order to make the description easier to understand, a configuration in which the reflective light modulation element 132, the polarization scrambler 136, the projection optical system 140, and the screen 1 are linearly disposed is schematically illustrated. That is, illustration of the color combination prism 135 and the like shown in FIG. 1 is omitted. Although an example in which the image light 10' in the unpolarized state is generated will be described below with reference to FIG. 5, the principle thereof is similarly applied to the configuration illustrated in FIG. 1.

As illustrated in FIG. 1, FIG. 5, or the like, the polarization scrambler 136 is disposed so as to be perpendicular to an optical axis direction C of the image light 10. The optical axis direction of the image light 10 can be specified by, for example, an axis through which a light beam at the center of the image light 10 (referred to also as pixel light) emitted from a pixel P1 at the center of the reflective light modulation element 132.

The pixel light is diffused and emitted from each pixel of the reflective light modulation element 132. The pixel light of each pixel is collected on the screen 1 by the projection optical system 140 or the like. As a result, the respective pixels forming an image 2 are displayed on the screen 1. For example, the pixel light emitted from the pixel P1 at the center of the reflective light modulation element 132 is displayed on the screen 1 as a pixel P2 at the center of the image 2.

Hereinafter, the optical axis direction of the image light 10 (pixel light) that enters the polarization scrambler 136 will be referred to as the Z direction. Further, the direction corresponding to the right-and-left direction of the image 2 formed by the image light 10 will be referred to as the X direction, and the direction corresponding to the up-and-down direction of the image 2 will be referred to as the Y direction. Further, for convenience, description will be made with the X direction, the Y direction, and the Z direction as the right-and-left direction, the up-and-down direction, and the thickness direction respectively with respect to the polarization scrambler 136.

In the configuration illustrated in FIG. 5, the right-and-left direction and the up-and-down direction of the polarization scrambler 136 and the right-and-left direction and the up-and-down direction of the image 2 are the same directions, respectively. It goes without saying that the present technology is not limited thereto. Depending on the configurations of the lighting optical system 110, the image generation unit 130, and the projection optical system 140, the right-and-left direction and the up-and-down direction of the polarization scrambler 136 and the right-and-left direction and the up-and-down direction of the image 2 are different directions in some cases.

Part A of FIG. 3 is a front view of the polarization scrambler 136 viewed from the incident surface side.

Part B of FIG. 3 is a top view of the polarization scrambler 136 viewed from above.

Part A of FIG. 4 is a perspective view of the polarization scrambler 136 viewed from the incident surface side.

Part B of FIG. 4 is a perspective view of the polarization scrambler 136 viewed from the emission surface side.

The polarization scrambler 136 has an incident surface 20 and an emission surface 21, the image light 10 entering the incident surface 20, the emission surface 21 emitting the image light 10' in the unpolarized state. Further, the polarization scrambler 136 has an upper surface 22, a lower surface 23, a left side surface 24, and a right side surface 25 that surround the incident surface 20 from the up, down, left, and right directions as viewed from the front of the incident surface 20.

The polarization scrambler 136 converts the polarization state of the image light 10 that enters the incident surface 20 and emits the converted light as the image light 10' in the unpolarized state from the emission surface 21. Further, the polarization scrambler 136 is configured such that conversion properties of the polarization states are non-uniform in the incident surface 20. That is, the polarization property differ depending on the position at which the image light 10 enters in the incident surface 20.

In this embodiment, it is possible to add a phase difference to the image light 10 that enters the incident surface 20, and the polarization scrambler 136 is configured such that the phase difference added to the image light 10 is non-uniform in the incident surface 20. That is, the polarization scrambler 136 is configured such that the birefringence with respect to the image light 10 is non-uniform in the incident surface 20.

As shown in FIG. 3 and FIG. 4, the polarization scrambler 136 is formed of a predetermined material having an optical anisotropy such that the thickness from the incident surface 20 to the emission surface 21 in the optical axis direction of the image light 10 is non-uniform in the incident surface 20. Note that the thickness being non-uniform in the incident surface 20 means that the thickness in the optical axis direction C at each position in the incident surface 20 is non-uniform.

The phase difference added to the image light 10 is specified by the product of the thickness and the difference between the refractive index in the slow axis and the refractive index in the fast axis. In this regard, the polarization scrambler 136 is formed of a material that the difference between the refractive index in the slow axis and the refractive index in the fast axis is uniform, such that the thickness is non-uniform. As a result, it is possible to easily realize the configuration in which conversion properties of the polarization state are non-uniform in the incident surface 20.

As shown in FIG. 3 and FIG. 4, in this embodiment, the emission surface 21 is tilted with respect to the incident surface 20 along the right-and-left direction (direction corresponding to the right-and-left direction of the image 2). For this reason, as shown in the top view of Part B of FIG. 3, the thickness of the polarization scrambler 136 is reduced in a continuous manner along the right-and-left direction. As a result, it is possible to change the conversion properties of the polarization state in a continuous manner along the right-and-left direction in the incident surface 20. In this embodiment, the right-and-left direction corresponds to the predetermined direction.

As shown in Part B of FIG. 3, the size of the left side surface 24 along the optical axis direction is the minimum thickness d1 of the polarization scrambler 136. The size of the left side surface 24 along the optical axis direction is the maximum thickness d2 of the polarization scrambler 136. A difference Δd between the thickness d1 and the thickness d2 is a parameter relating to the difference in the polarization properties. That is, the difference Δd is a parameter relating to the phase difference added to the image light 10.

For example, assumption is made that the thickness d1 is 0.450 mm an the thickness d2 is 0.500 mm. In this case, the difference Δd is 0.050 mm. With such design, the image light 10 can be sufficiently converted into the image light 10' in the unpolarized state.

Note that the method of setting the thickness d1, the thickness d2, and the difference Δd between the thicknesses is not limited, and they may be arbitrarily set. For example, of the image light 10 that is desired to be converted into light in the unpolarized state, a reference wavelength λ is set. For example, a wavelength that is difficult to convert into light in the unpolarized state, or the like is used as a reference wavelength. It goes without saying that the present technology is not limited thereto.

The minimum thickness d1 and the maximum thickness d2 are set such that the difference between the minimum phase difference and the maximum phase difference added to the image light 10 is equal to or larger than ¼ of the reference wavelength λ. For example, the polarization scrambler 136 is designed such that the product of the difference between the refractive index in the slow axis and the refractive index in the fast axis and the difference Δd between the thicknesses is equal to or larger than ¼ of the reference wavelength λ. As a result, the image light 10 can be sufficiently converted into the image light 10' in the unpolarized state.

[Polarization Property of Polarization Scrambler 136]

Figure 6:
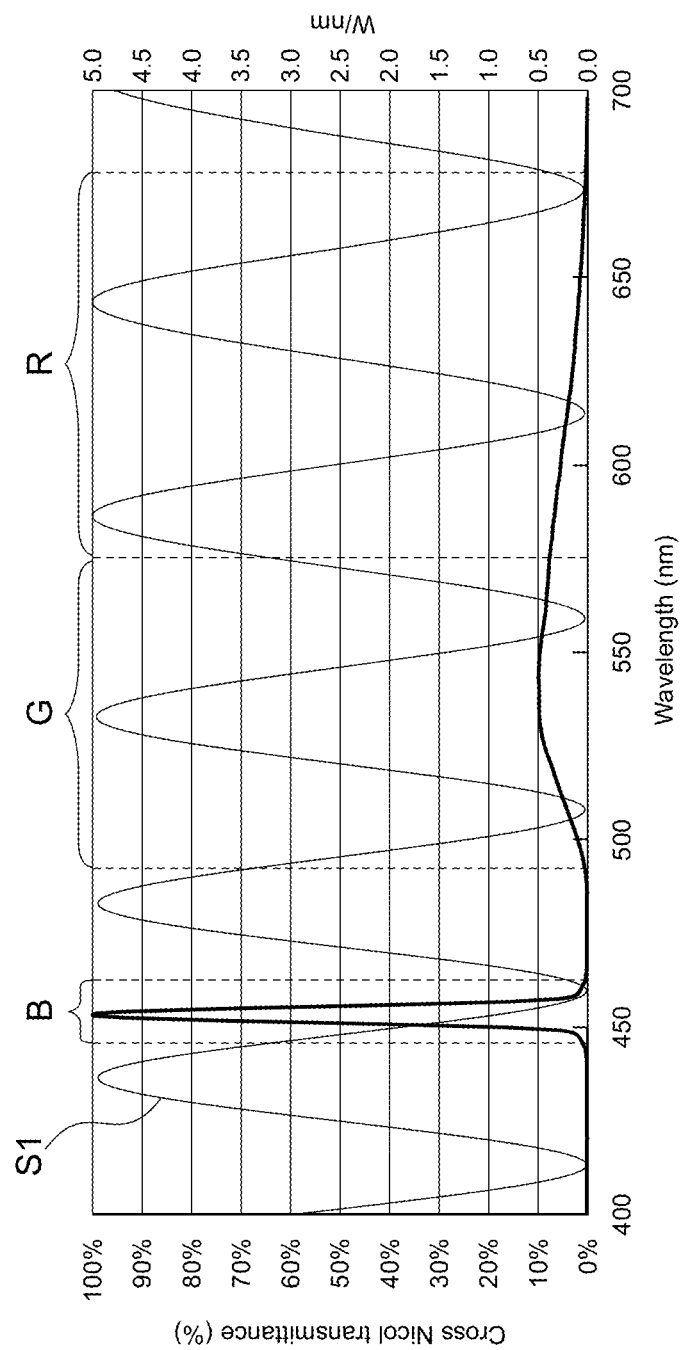
FIG. 6 is a graph for describing a polarization property of the polarization scrambler.
Figure 7:
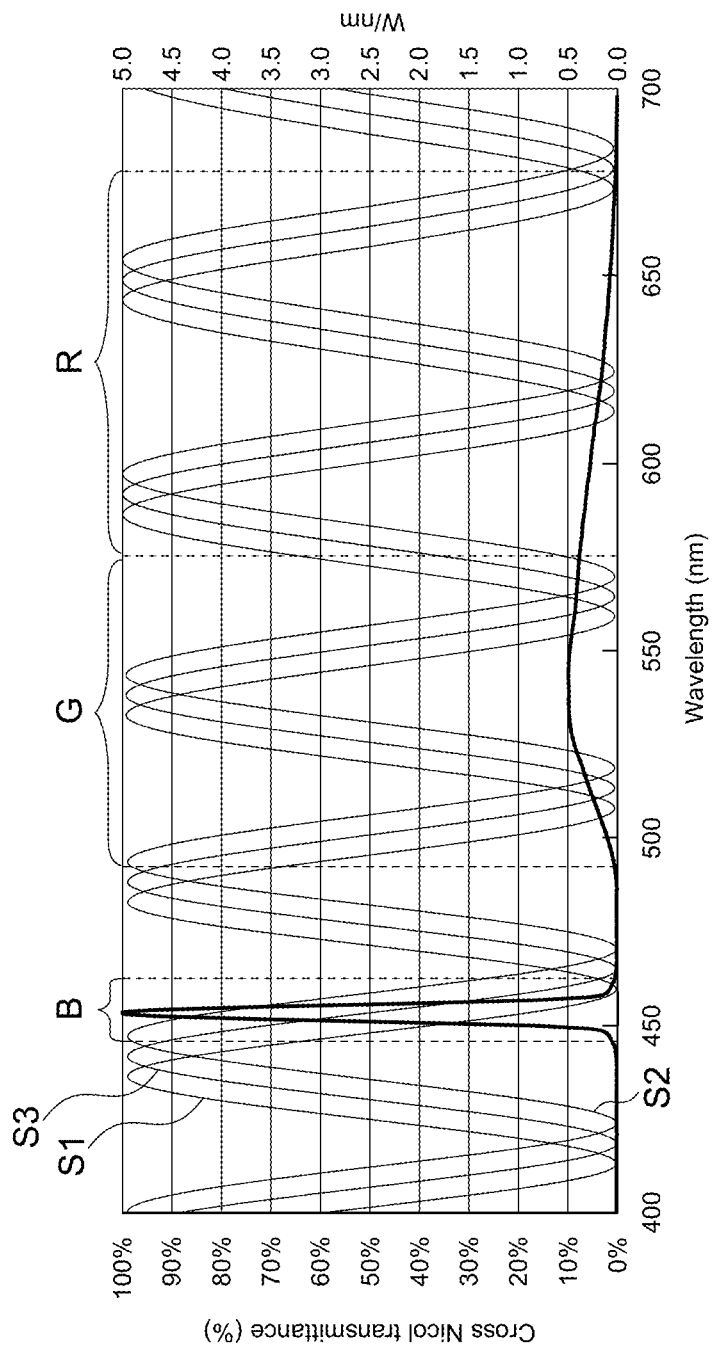
FIG. 7 is a graph for describing a polarization property of the polarization scrambler.
Figure 8:
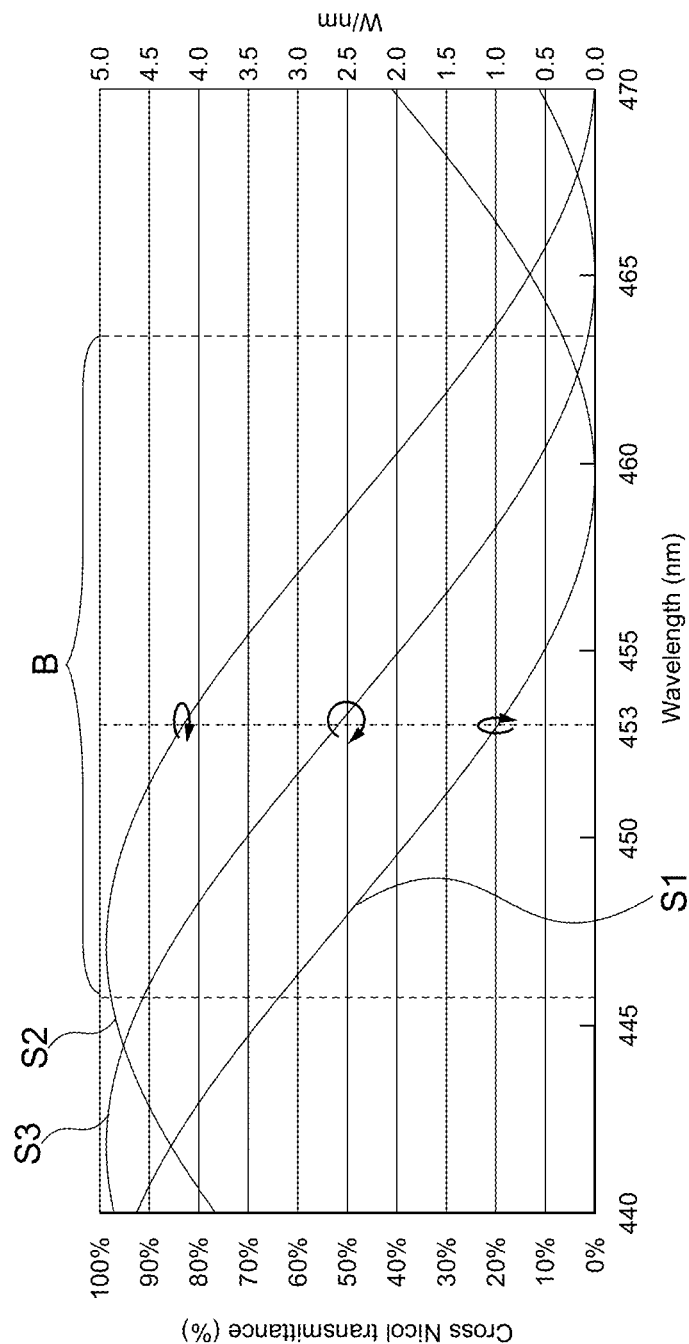
FIG. 8 is a graph for describing a polarization property of the polarization scrambler.

FIG. 6 to FIG. 8 are each a graph for describing the polarization property of the polarization scrambler 136. The polarization property of the polarization scrambler 136 will be described with reference to FIG. 6 to FIG. 8 and FIG. 5.

Here, as shown in FIG. 6 or the like, a case where the white light W is generated by a blue laser beam and yellow light is taken as an example, the blue laser beam having the center wavelength (peak wavelength) of 453 nm, the yellow light being generated by being excited by the blue laser beam.

Further, as shown in FIG. 6 or the like, a bandwidth in which light is emitted, of the white light W, i.e., a wavelength band in which the radiant flux (W/nm) is greater than 0.0, will be described separately as a blue wavelength band B (approximately 446 nm to approximately 463 nm), a green wavelength band G (approximately 490 nm to approximately 575 nm), and a red wavelength band R (approximately 475 nm to approximately 678 nm).

Assumption is made that wavelength light of 453 nm is emitted from the pixel P1 at the center of the reflective light modulation element 132, with reference to FIG. 5. In FIG. 5, of the pixel light diffused from the central pixel P1, light (light that travels in the optical axis direction C) L0 that passes through the center of the polarization scrambler 136, light L1 that passes through the left end of the center of the polarization scrambler 136, and light L2 that passes through the right end are illustrated.

FIG. 6 is a graph showing a polarization property S1 corresponding to the minimum thickness d1. For example, it can be said to be the polarization property of the polarization scrambler 900 formed to have the uniform thickness d1. The polarization property S1 shown in FIG. 6 corresponds to the polarization property acting on the light L1 that passes through the left end (in the vicinity of the left side surface 24) shown in FIG. 5.

As shown in FIG. 6, in the blue wavelength band B, light in the polarization state having the cross Nicol transmittance of 0% to approximately 62% is included. Meanwhile, in the green wavelength band G and the red wavelength band R, light in the polarization state having the transmittance of 0% to 100% is included. Therefore, in the blue wavelength band B having narrow spectral distribution, the scramble degree is lower than those in the green wavelength band G and the red wavelength band R having wide spectral distribution.

FIG. 7 is a graph showing the polarization property S1 corresponding to the minimum thickness d1, a polarization property S2 corresponding to the maximum thickness d2, and a polarization property S3 corresponding to the middle thickness thereof. The polarization property S2 corresponding to the maximum thickness d2 corresponds to the polarization property acting on the light L2 that passes through the right end (in the vicinity of the right side surface 25) shown in FIG. 5. Further, the polarization property S3 corresponding to the middle thickness corresponds to the polarization property acting on the light L0 that travels in the optical axis direction C.

FIG. 8 is an enlarged graph showing the portion of wavelength light of 453 nm of the graph shown in FIG. 7. In FIG. 8, the ratio of the vertical axis and the horizontal axis is different from that in FIG. 7.

The thickness of the polarization scrambler 136 is changed from the thickness d1 to the thickness d2 in a continuous manner along the right-and-left direction. As a result, the polarization property of the polarization scrambler 136 is changed from the polarization property S1 to the polarization property S2 in a continuous manner along the right-and-left direction. As a result, as shown in FIG. 7, in the blue wavelength band B, it is possible to generate light in the polarization state from the transmittance of 0% to 100%. That is, even with narrow spectral distribution, it is possible to generate light having a high scramble degree, similarly to the green wavelength band G and the red wavelength band R.

As shown in FIG. 5 and FIG. 8, the light L1 that passes through the left end of the polarization scrambler 136 is converted into vertically-long elliptically polarized light by the polarization property S1. The light L0 that passes through the center is converted into circularly polarized light by the polarization property S3. The light L2 that passes through the right end is converted into horizontally-long elliptically polarized light by the polarization property S2. Even in the case where only wavelength light of 453 nm is seen, lights from vertically-long elliptically polarized light to horizontally-long elliptically polarized light are generated. Therefore, in the whole blue wavelength band B, light having a sufficiently high scramble degree is generated. It goes without saying that the scramble degree is improved regarding also the green wavelength band G and the red wavelength band R.

For example, the polarization property of the polarization scrambler 136 may be designed using, as a reference wavelength, the wavelength of 453 nm included in the blue wavelength band having narrow spectral distribution. It goes without saying that another wavelength of the blue wavelength band may be selected as a reference wavelength. Further, a wavelength included in a green wavelength band or a red wavelength band different from the blue wavelength band may be selected as a reference wavelength.

Note that in the polarization scrambler 136 shown in FIG. 5, the polarization property does not change in the up-and-down direction of the incident surface 20. Typically, the image light 10 is emitted such that the luminance distribution is constant across the board. Therefore, by changing the polarization property in a continuous manner along the direction corresponding to the right-and-left direction of the image 2, it is possible to emit the image light 10' having a high scramble degree. Note that the polarization scrambler 136 may be configured such that the polarization property changes in a continuous manner along the up-and-down direction of the image 2. That is, the polarization scrambler 136 may be configured such that the thickness changes in a continuous manner along the up-and-down direction of the image 2.

Figure 9:
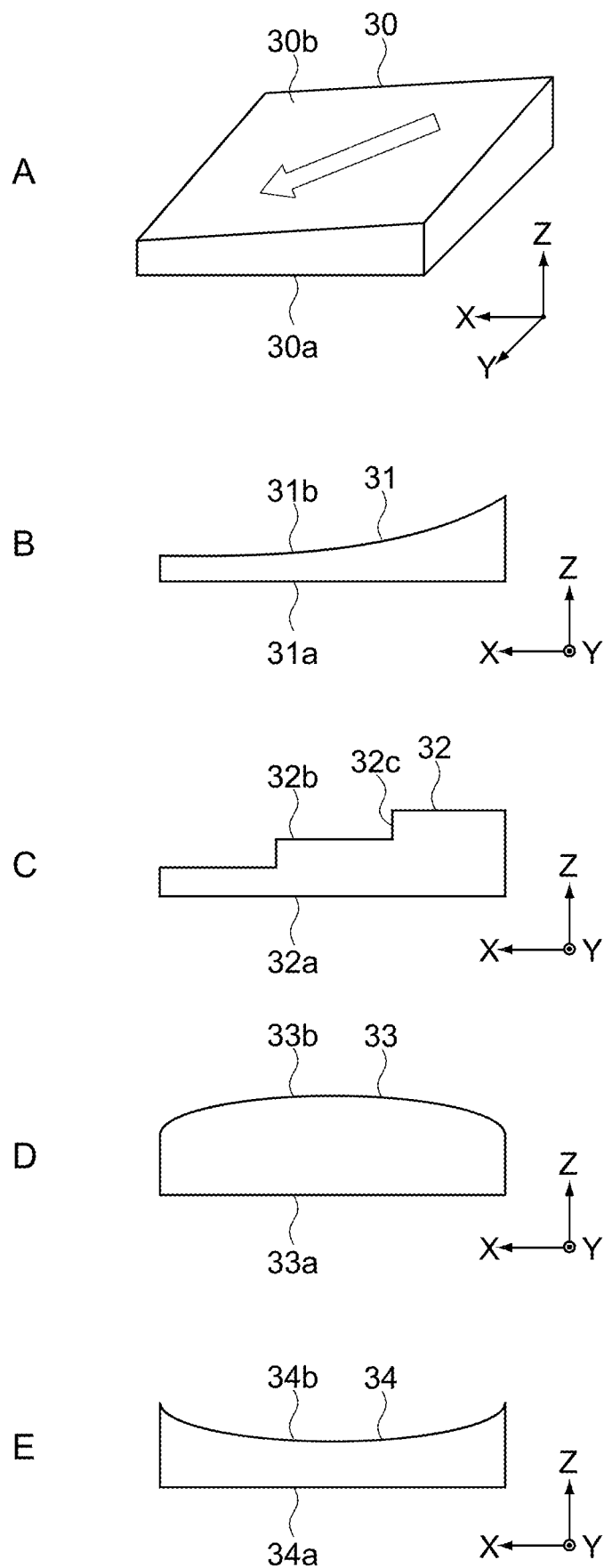
FIG. 9 is a schematic diagram showing another configuration example of the polarization scrambler.

FIG. 9 is a schematic diagram showing another configuration example of a polarization scrambler. Parts A to E of FIG. 9 show variations in the configuration in which polarization properties of polarization scramblers 30 to 34 are non-uniform in incident surfaces 30a to 34a, respectively. Specifically, the polarization scramblers 30 to 34 are configured such that the thicknesses are non-uniform in the incident surfaces 30a to 34a, respectively.

As shown Part A of FIG. 9, a configuration in which the emission surface 30b is tilted with respect to the incident surface 30a relative to the biaxial direction of the X direction and the Y direction may be employed. In the example shown in Part A of FIG. 9, the thickness is changed at the same ratio in each of the X direction and the Y direction. Therefore, the thickness is changed along the middle direction (direction intersecting the X direction and the Y direction at the angle of 45° as viewed from the Z direction) of the X direction and the Y direction.

As shown in Part B of FIG. 9, the emission surface 31 may have a curved surface shape. For example, the emission surface 31b is formed such that the shape viewed from the Y direction is a curved shape from the left side surface of the minimum thickness d1 toward the right side surface of the maximum thickness d2. The specific shape of the curved surface is not limited, and may be arbitrarily designed.

As shown in Part C of FIG. 9, a step 32c may be formed in the emission surface 32b. By forming the step 32c, it is possible to make the thickness in the incident surface 32a non-uniform, and make the polarization property non-uniform. The number, position, size (height), and the like of the step 32c may be arbitrarily designed.

As shown in Part D of FIG. 9, a configuration in which the emission surface 33b is formed to have a projecting shape to form a projecting lens shape as a whole may be employed. Further, as shown in Part E of FIG. 9, a configuration in which the emission surface 33b is formed to have a projecting shape to form a recessed lens shape may be employed. Even with such a configuration, it is possible to make the thickness in the incident surface 32a non-uniform and make the polarization property non-uniform. The curvature and the like of the projecting shape and the recessed shape are not limited, and may be arbitrarily designed. In addition, an arbitrary configuration may be employed. For example, by appropriately designing the shape of the polarization scrambler in accordance with the region that the image light 10 enters and the wavelength band or the like of the light source to be used, it is possible to generate and emit sufficiently-scrambled light in the unpolarized state.

Further, the thickness may be controlled by changing the shape on the side of the incident surfaces 30a to 34a.

Further, the configuration in which the polarization property in the incident surface is made non-uniform is not limited to the case where the thickness is made non-uniform. By appropriately controlling the material forming the polarization scrambler, the physical properties, or the like, it is possible to make the polarization property in the incident surface non-uniform while making the thickness uniform. For example, by appropriately controlling the material forming the polarization scrambler or the physical properties, the polarization scrambler can be configured such that the phase difference added to incident light is non-uniform in the incident surface. Further, the polarization scrambler can be configured such that the birefringence is non-uniform in the incident surface. As a result, it is possible to generate and emit image light in the unpolarized state, which has a high scramble degree. It goes without saying that both the controlling of the thickness and the controlling of the material or the physical properties may be performed.

As described above, in the image display apparatus 100 according to this embodiment, the polarization scrambler 136 that converts the conversion state of the image light 10 and emits the converted light as the image light 10' in the unpolarized state is provided. The polarization scrambler 136 is configured such that the conversion properties of the polarization state are non-uniform in the incident surface 20. As a result, it is possible to sufficiently depolarize the image light 10 and display a high-quality image.

Since the image light 10 can be scrambled more, it is possible to make the polarization disturbance in the projection lens or the like less noticeable, and sufficiently reduce the uneven polarization in the case where short-focus projection is executed or a special screen (e.g., a silver screen/bead screen/prism screen/white board) is used.

Further, it is possible to generate sufficiently-scrambled light in the unpolarized state even with respect to a narrow-spectral light source such as an LD and LED.

Further, since lights in various polarization states can be multiplexed, it is possible to reduce speckles and display a high-quality image.

Second Embodiment

An image display apparatus according to a second embodiment of the present technology will be described. In the following description, descriptions of configurations and effects similar to those in the image display apparatus 100 described in the above-mentioned embodiment will be omitted or simplified.

Figure 10:
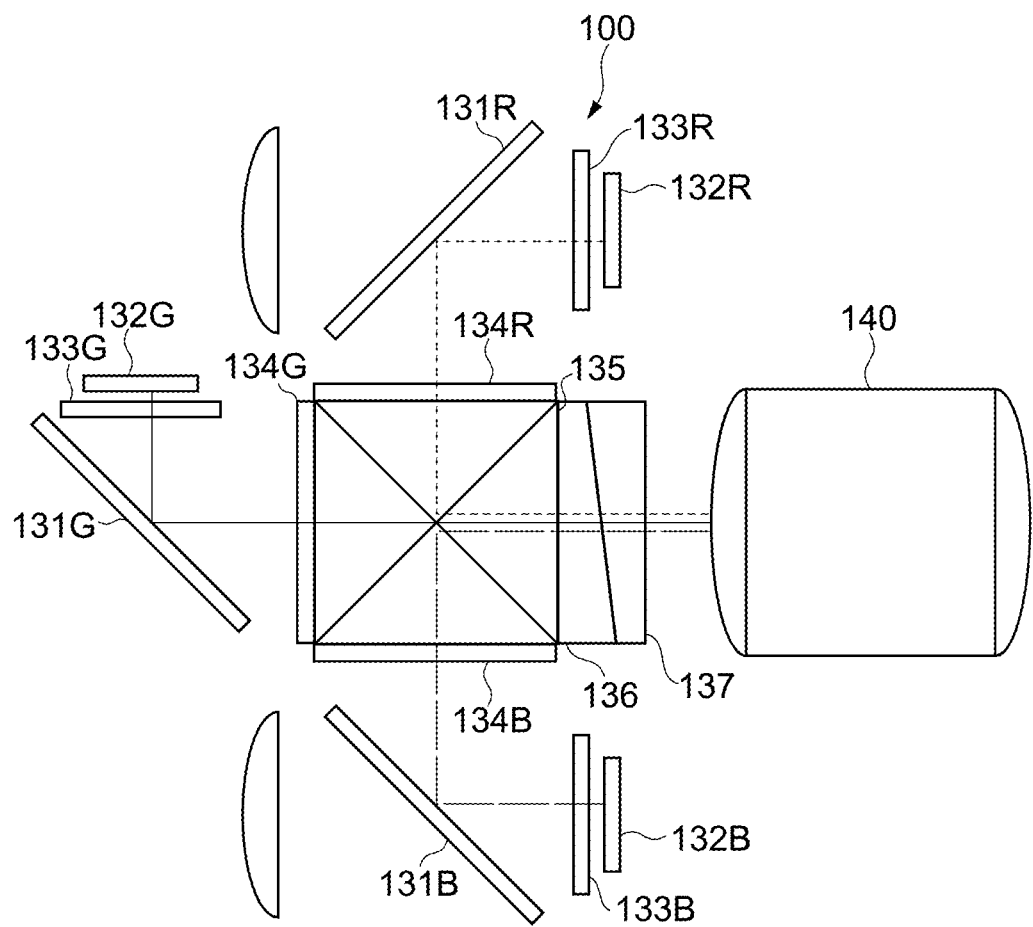
FIG. 10 is a schematic diagram showing a configuration example of an image display apparatus according to a second embodiment.

FIG. 10 is a schematic diagram showing a configuration example of an image display apparatus 200 according to this embodiment. Regarding the image display apparatus 200, the same components as those in the image display apparatus 100 according to the first embodiment are denoted by the same reference symbols. In the image display apparatus 200 according to this embodiment, a suppression member 137 is disposed on the polarization scrambler 136.

Figure 11:
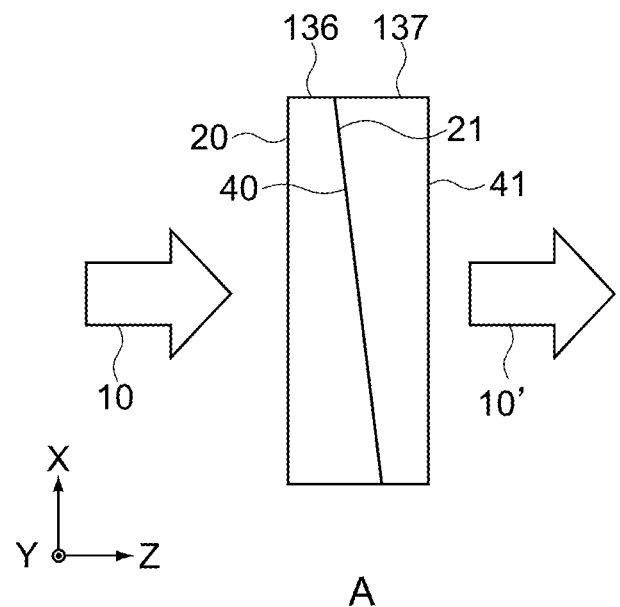
FIG. 11 is a schematic diagram showing a configuration example of a suppression member.
Figure 11:
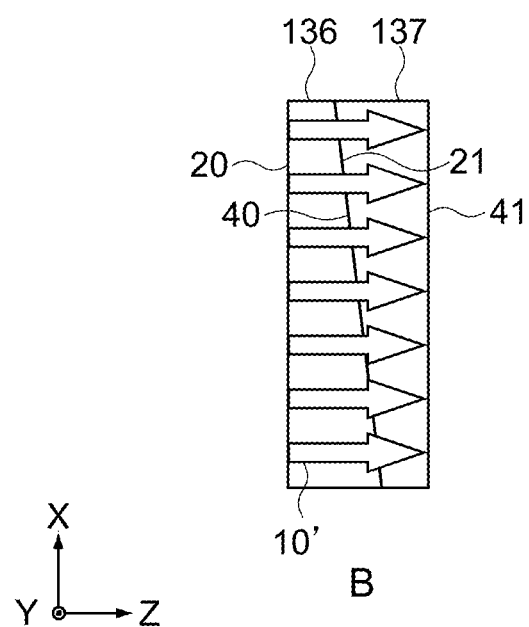

FIG. 11 is a schematic diagram showing a configuration example of the suppression member 137. As shown in FIG. 11, the suppression member 137 includes a suppression incident surface 40 and a suppression emission surface 41. The suppression incident surface 40 is a surface that the image light 10' in the unpolarized state emitted from the polarization scrambler 136 enters. The suppression emission surface 41 is a surface that emits the image light 10' in the unpolarized state that has entered the suppression incident surface 40.

As shown in Part B of FIG. 11, the suppression member 137 is configured to be capable of emitting the image light 10' from the suppression emission surface 41 while suppressing a variation in the optical distance of the image light 10' from the incident surface 20 to the emission surface 21 of the polarization scrambler 136. This can be said that the variation in the optical distance of the image light 10' from the incident surface 20 of the polarization scrambler 136 to the suppression emission surface 41 of the suppression member 137 can be suppressed. Note that the optical distance is a parameter specified by multiplying the distance that light has actually travelled by the refractive index of an object through which the light has passed.

For example, the suppression member 137 is formed of a material having no optical anisotropy, such as optical glass. Further, the suppression member 137 is formed to have a shape equivalent to that of the polarization scrambler 136 shown in FIG. 11. That is, the suppression member 137 is configured such that the thickness in the optical axis direction of the image light 10' changes along the right-and-left direction (X direction) at the same ratio as that of the polarization scrambler 136.

Then, as shown in FIG. 11, the suppression member 137 is disposed such that the tilted surface of the suppression member 137 as the suppression incident surface 40 comes into contact with the emission surface 21 of the polarization scrambler 136. The suppression member 137 is disposed such that the polarization scrambler 136 and the suppression member 137 form a rectangular parallelepiped shape as a whole.

As a result, the suppression emission surface 41 of the suppression member 137 is parallel to the incident surface of the polarization scrambler 136. Further, the suppression member 137 is disposed such that the distance from the incident surface 20 to the suppression emission surface 41 is uniform in the optical axis direction of the image light 10'. As a result, it is possible to easily emit the image light 10' from the suppression emission surface 41 while suppressing a variation in the optical distance of the image light 10' from the incident surface 20 to the emission surface 21 of the polarization scrambler 136.

Note that the emission surface 21 of the polarization scrambler 136 and the suppression incident surface 40 of the suppression member 137 may come into contact with each other via an arbitrary adhesive or the like. In this case, it is possible to regard the adhesive as part of the suppression member. Further, processing such as polishing is executed on the suppression incident surface 40, the suppression emission surface 41, and the like of the suppression member 137. As a result, it is possible to emit the image light 10' without reducing the accuracy of the transmission wave surface.

For example, assumption is made that the polarization scrambler 136 is formed of quartz having a refractive index of approximately 1.58. The refractive index of quartz having optical axis anisotropy can be specified by, for example, the refractive index in the slow axis or the fast axis. The suppression member 137 formed of a material having a refractive index of 1.47 to 1.80 is disposed on such a polarization scrambler 136. As a result, as compared with the case where the suppression member 137 is not provided, i.e., the image light 10' is emitted from the emission surface 21 toward the air of a refractive index 1, it is possible to emit the image light 10' while suppressing a variation in the optical distance of the image light 10' from the incident surface 20 to the emission surface 21.

That is, it is possible to sufficiently suppress the variation in the optical distance by appropriately specifying the refractive index of the suppression member 137 on the basis of the refractive index of the polarization scrambler 136. For example, high effects are exhibited by making the refractive index of the suppression member 137 equal to the refractive index of the polarization scrambler 136.

Figure 12:
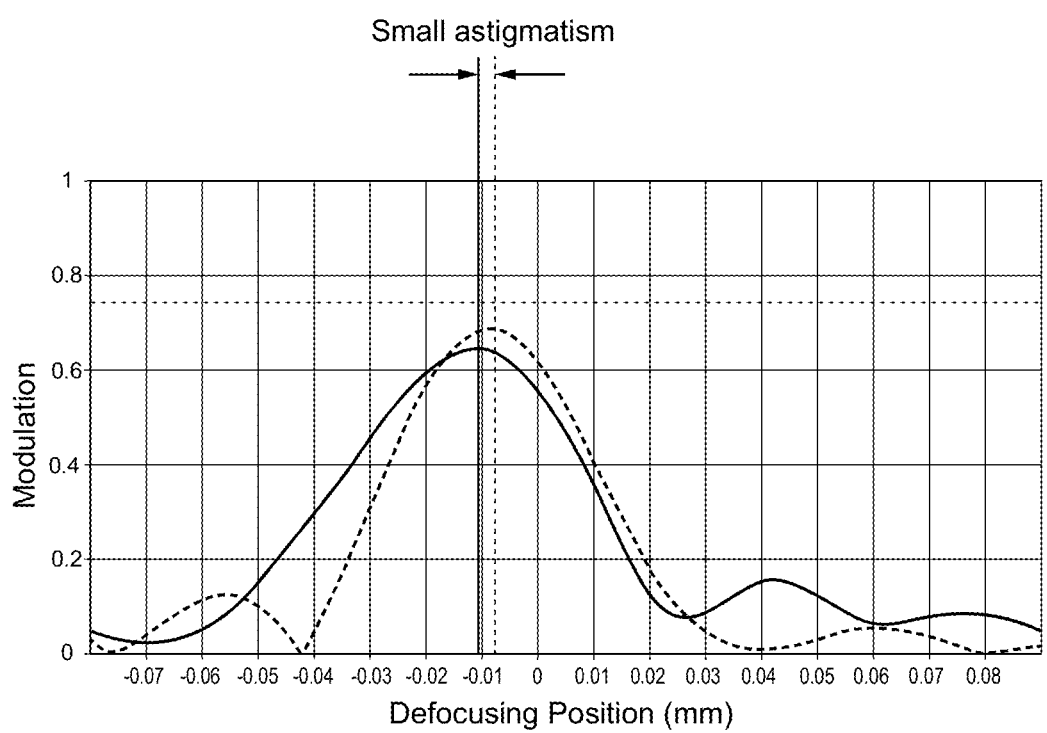
FIG. 12 is a graph showing results of simulating evaluation of occurrence of astigmatism (with a polarization scrambler having a uniform thickness, without suppression member).
Figure 13:
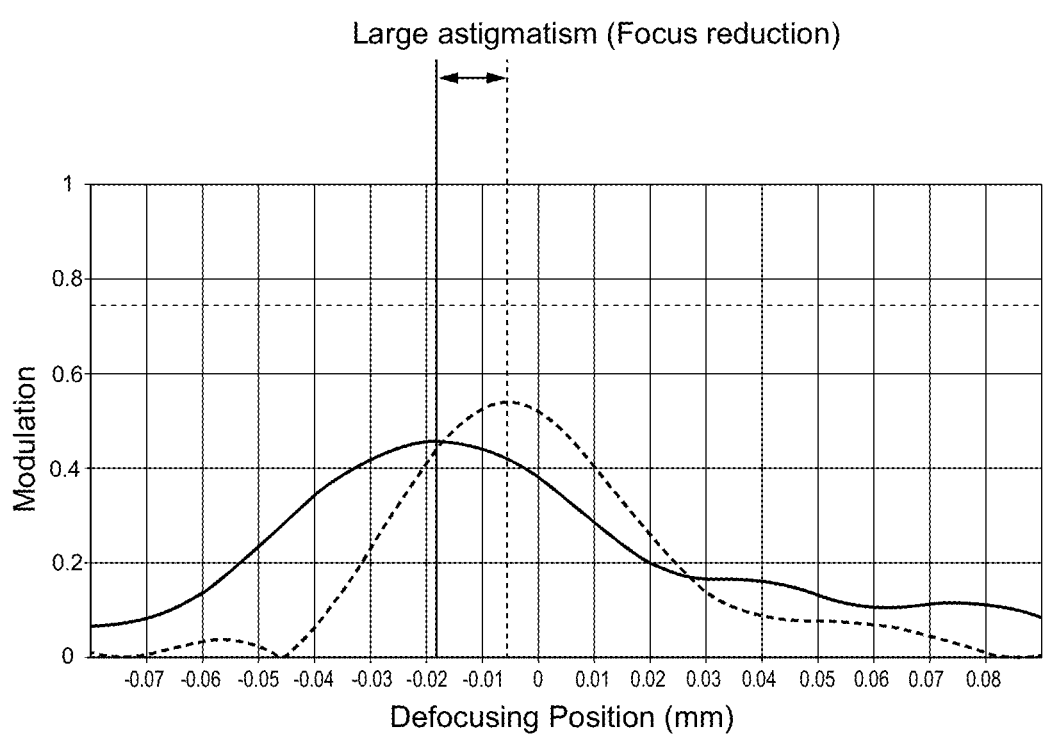
FIG. 13 is a graph showing results of simulating evaluation of occurrence of astigmatism (with a polarization scrambler having a non-uniform thickness, without no suppression member).
Figure 14:
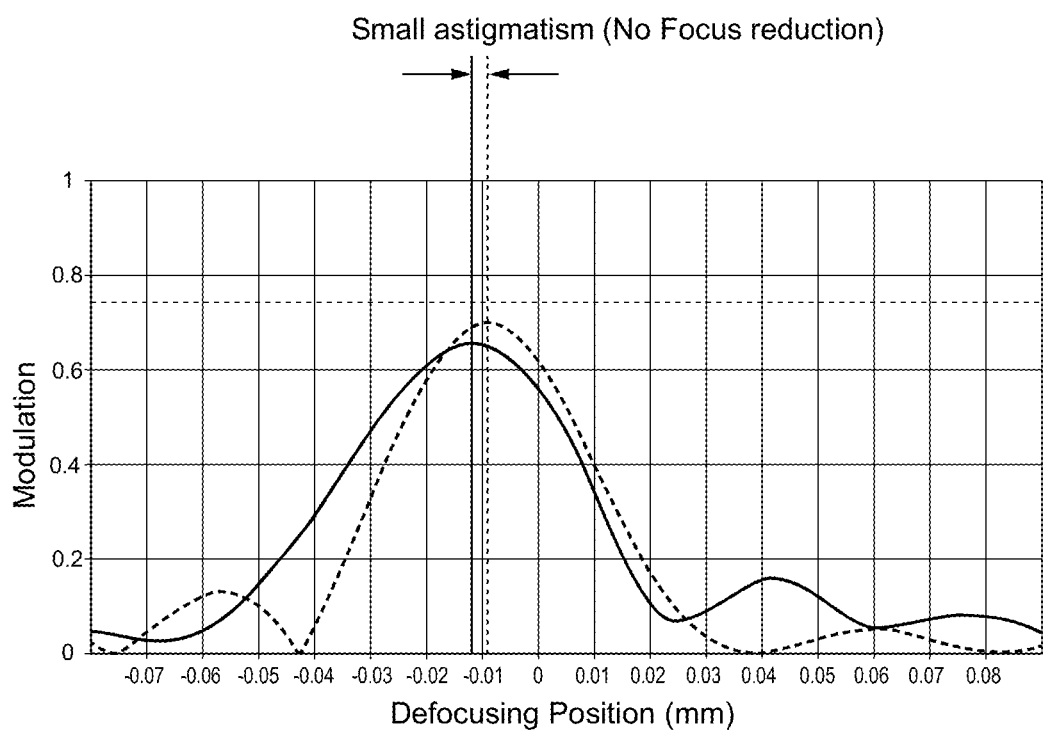
FIG. 14 is a graph showing results of simulating evaluation of occurrence of astigmatism (with a polarization scrambler having a non-uniform thickness and a suppression member).

FIG. 12 to FIG. 14 are each a graph showing results of simulating evaluation of occurrence of astigmatism with respect to the polarization scrambler 136 and the suppression member 137.

The "Modulation" of the vertical axis of the graph an axis indicating how faithfully the image 2 can be reproduced with respect to the original image (axis indicating the contrast of the image 2 focused on the screen 1). For example, assuming that the original image is an image in which black and white are alternately displayed for each dot, it is possible to evaluate how faithfully the contrast can be reproduced, by the appearance of the image 2 on the screen 1.

In the vertical axis, 1 corresponds to the state where the contrast can be completely reproduced (black·white·black·white . . . ), and 0 corresponds to the state where the contrast is not reproduced at all (grey·grey·grey·grey . . . ). An intermediate value between 0 and 1 corresponds to the state where the contrast is highly reproduced as the value is closer to 1 (e.g., dark grey·whitish grey·dark grey·whitish grey . . . )

The "Defocusing Position (mm)" of the horizontal axis indicates the focused position in the optical axis direction in the case where a light beam in which light emitted from the image 2 projected on the screen 1 is focused on the reflective light modulation element 132 is drawn.

In the graph, the results of light emitted from the same predetermine pixel of the projected image 2 are illustrated.

The graph of a solid line indicates light focused in the sagittal direction. The graph of a dashed line indicated light focused in the meridional direction.

The peak difference between the solid line and the dashed line indicates the difference between the focused positions in the optical axis direction of the light focused in the sagittal direction and the light focused in the meridional direction. The larger the difference between the positions, the more blurred the focused light will be, The smaller the difference, the clearer the focused light will be. As shown in the graph, the peak difference between the solid line and the dashed line corresponds to the size of the astigmatism.

The graph of FIG. 12 shows the simulation results in the case where the polarization scrambler 136 that is formed of a uniaxial crystalline material and is configured such that the thickness in the optical axis direction of the image light 10' is uniform is disposed. Note that the suppression member 137 is not disposed. As shown in FIG. 12, it can be seen that the astigmatism is small and high focusing performance is exhibited.

The graph of FIG. 13 shows the simulation results in the case where the polarization scrambler 136 that is formed of a uniaxial crystalline material and is configured such that the thickness in the optical axis direction of the image light 10' changes in a continuous manner in the right-and-left direction is disposed. That is, the graph of FIG. 13 shows the simulation results in the case where the polarization scrambler 136 illustrated in FIG. 3, FIG. 4, or the like is disposed. Note that the suppression member 137 is not disposed. As shown in FIG. 13, it can be seen that the astigmatism increases and the focusing performance is reduced.

The graph of FIG. 14 shows the simulation results in the case where the polarization scrambler 136 that is formed of a uniaxial crystalline material such that the thickness in the optical axis direction of the image light 10' changes in a continuous manner in the right-and-left direction, and the suppression member 137 are disposed. That is, the graph of FIG. 14 shows the simulation results in the case where the configuration illustrated in FIG. 11 is employed. As shown in FIG. 14, it can be seen that the astigmatism is small and high focusing performance is exhibited.

That is, even in the case where the polarization scrambler 136 in which the polarization property is non-uniform in the incident surface 20 is used, it is possible to prevent the focusing performance from being reduced, by disposing the suppression member 137.

Figure 15:
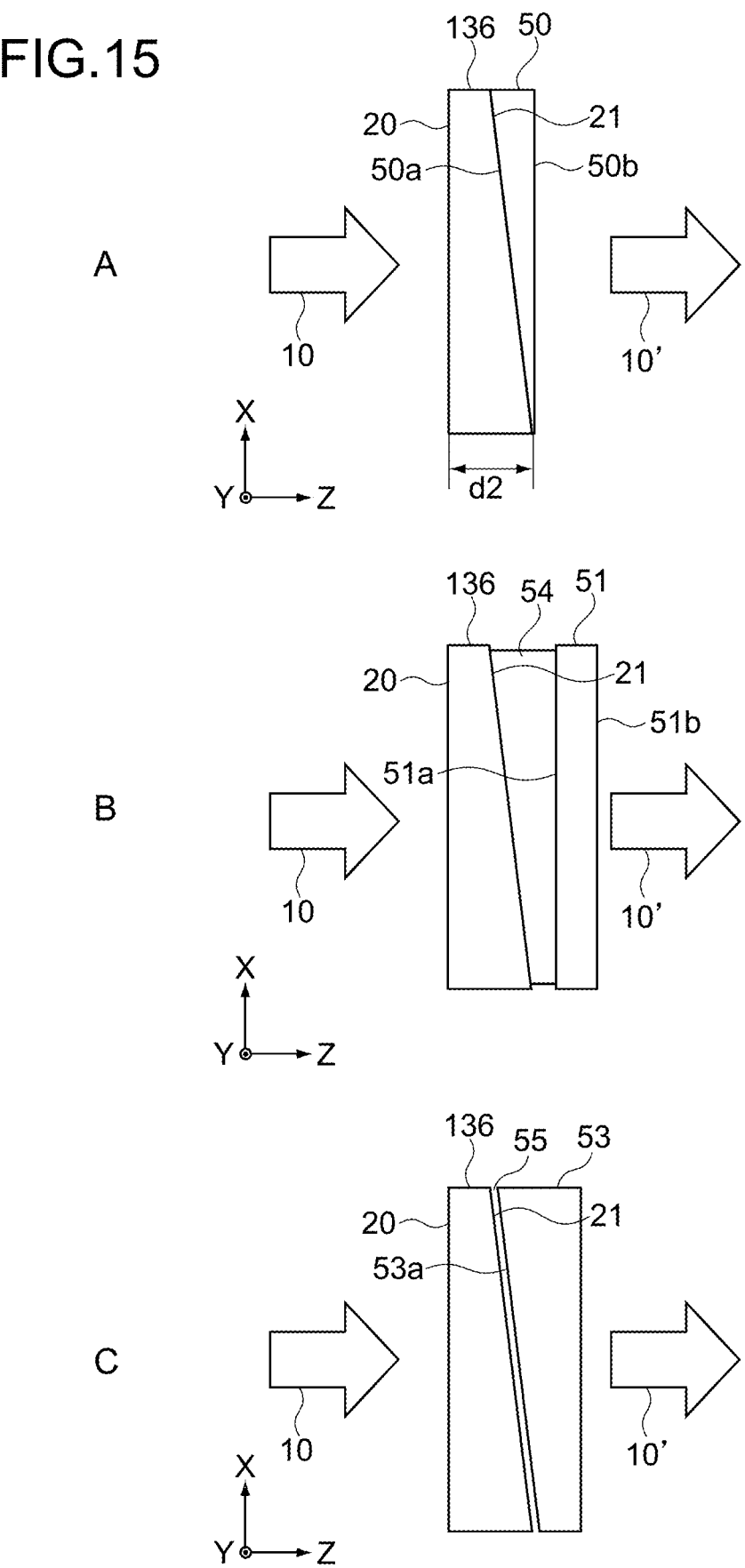
FIG. 15 is a schematic diagram showing another configuration example of the suppression member.

FIG. 15 is a schematic diagram showing another configuration example of the suppression member. Parts A to E of FIG. 15 show variations in the configuration in which suppression members 50 to 53 are disposed on the polarization scrambler 136 to form rectangular parallelepiped shapes as a whole, respectively.

As shown in Part A of FIG. 15, the suppression member 50 may be configured to have a shape different from that of the polarization scrambler 136. For example, the suppression incident surface 50a comes into contact with the tilted surface (tilted interface) of the polarization scrambler 136 as the emission surface 21. Then, the suppression emission surface 50b is formed to be parallel to the incident surface 20 in accordance with the tip portion in the optical axis direction of the polarization scrambler 136. As a result, a rectangular parallelepiped shape in which the thickness in the optical axis direction is equal to the maximum thickness d2 of the polarization scrambler 136 is realized.

As shown in Part B of FIG. 15, the suppression member 51 that is formed of optical glass or the like and has a rectangular parallelepiped shape is disposed perpendicularly to the optical axis direction. Then, an adhesive 54 is applied between the emission surface 21 that is the tilted interface of the polarization scrambler 136 and a suppression incident surface 51a of the suppression member 51. The suppression member 51 is pressed against the polarization scrambler 136 along the optical axis direction while controlling the position of a suppression emission surface 51b of the suppression member 51. As a result, the polarization scrambler 136 and the suppression member 51 are connected to each other via the adhesive 54.

As described above, the gap between the emission surface 21 of the polarization scrambler 136 and the suppression incident surface 51a of the suppression member 51 may be filled with the adhesive 54. Further, by appropriately setting the refractive index of the adhesive 54, it is possible to enhance the function of suppressing the variation in the optical distance.

In the configuration shown in Part B of FIG. 15, the adhesive 54 can be regarded as part of the suppression member. In this case, part of the adhesive 54, which comes into contact with the emission surface 21 of the polarization scrambler 136, is a suppression incident surface. Further, in the case where the shape of the adhesive 54 can be properly controlled, it is also possible to realize a suppression member only by the adhesive 54.

As shown in Part C of FIG. 15, a gap (air gap) 55 having a very small width may be formed between the emission surface 21 of the polarization scrambler 136 and a suppression incident surface 53a of the suppression member 53. For example, the air gap 55 having a width of approximately 1 to 3 μm is capable of making the influence on the function of suppressing the variation in the optical distance small. As in the configuration shown in Part C of FIG. 15, the suppression member 53 may be disposed such that the suppression incident surface 53a is close to the emission surface 21 in parallel.

In addition, the material, the refractive index, and the like of the suppression member are not limited, and an arbitrary configuration capable of suppressing the variation in the optical distance of the image light 10' from the incident surface 20 to the emission surface 21 of the polarization scrambler 136 may be employed. For example, even in the case where the suppression member is realized by a material having an optical anisotropy, it is possible to suppress the variation in the optical distance of the image light 10'.

Further, the function of suppressing the variation in the optical distance by the suppression member is valid for the polarization scrambler 136 configured such that the polarization property is non-uniform in the incident surface while the thickness is uniform. By appropriately designing the shape of the suppression member in accordance with the polarization property of the polarization scrambler 136, it is possible to suppress the variation in the optical distance of the image light from the incident surface 20 to the emission surface 21 of the polarization scrambler 136.

In this embodiment, the polarization scrambler 136 and the suppression member 137 realize the image display unit. This image display unit may be configured to be interchangeable from the image display apparatus 200.

As described above, in the image display apparatus 200 according to this embodiment, the suppression member 137 is disposed on the polarization scrambler 136. As a result, it is possible to emit the image light 10' from the suppression emission surface 41 while suppressing the variation in the optical distance of the image light 10' from the incident surface 20 to the emission surface 21 of the polarization scrambler 136. That is, the suppression member 137 makes it possible to add an astigmatism reduction function. As a result, it is possible to make the astigmatism sufficiently small and display a high-quality image.

Further, since the astigmatism can be made sufficiently small, it is also possible to improve the focusing performance, axial chromatic aberration, magnification chromatic aberration, and the like.

Further, since the tilted interface of the polarization scrambler 136 can be covered with the suppression member 137, it is possible to prevent the reflected light reflected on the tilted interface from being applied to another unintended optical part. That is, it is possible to prevent ghosts or the like due to the tilted interface from occurring. Further, it is possible to prevent the ANSI contrast from being reduced.

Other Embodiments

The present technology is not limited to the embodiments described above, and can achieve various other embodiments.

Figure 16:
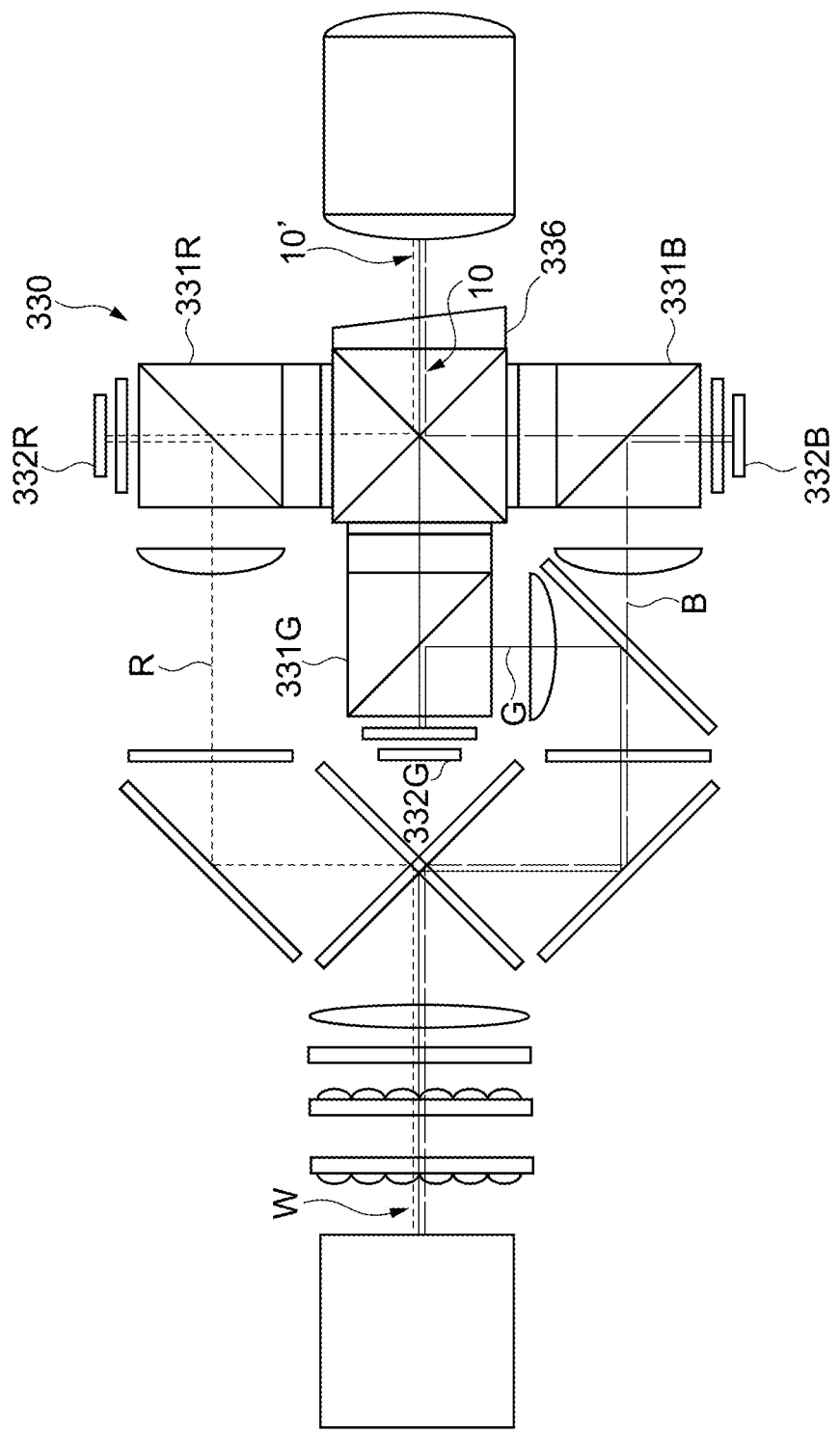
FIG. 16 is a schematic diagram showing another configuration example of the image generation unit.
Figure 17:
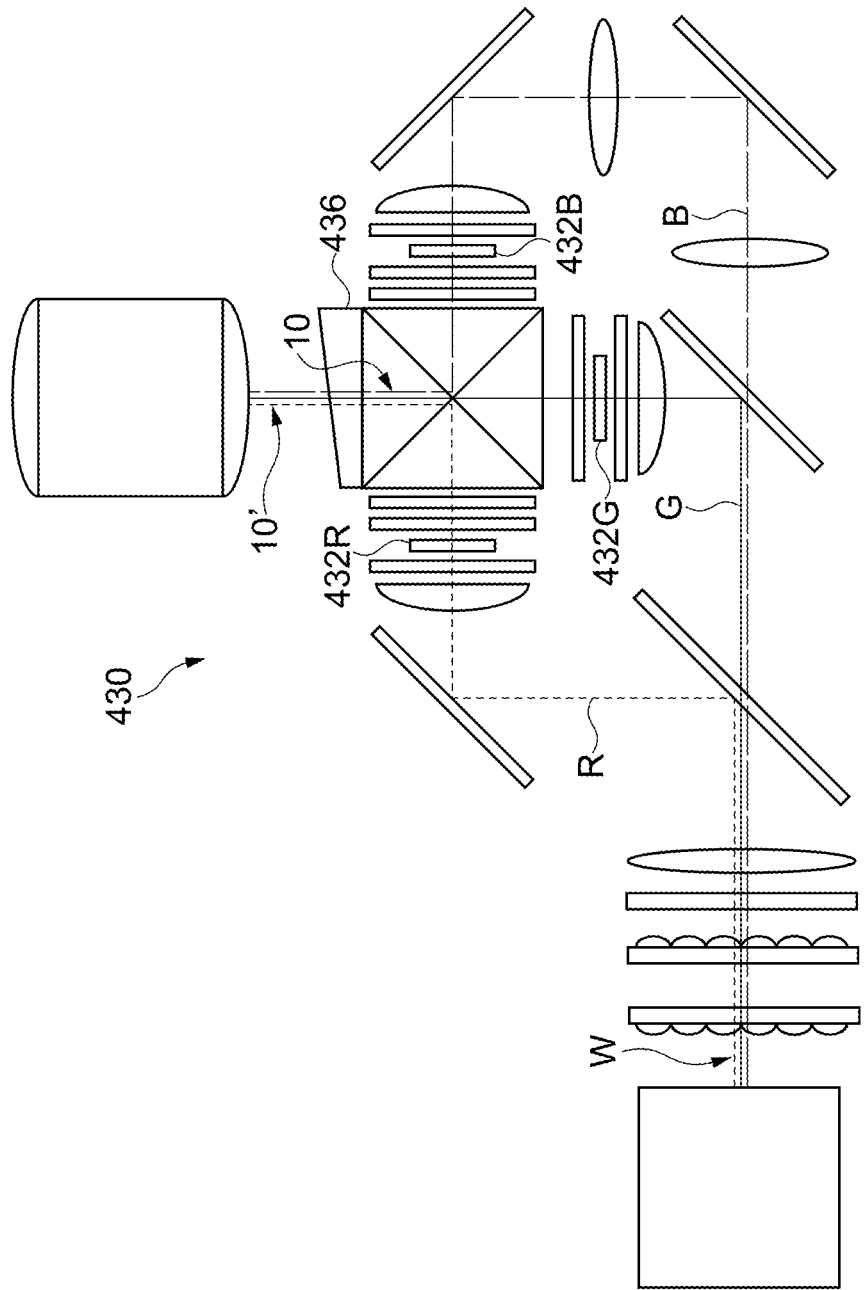
FIG. 17 is a schematic diagram showing another configuration example of the image generation unit.
Figure 18:
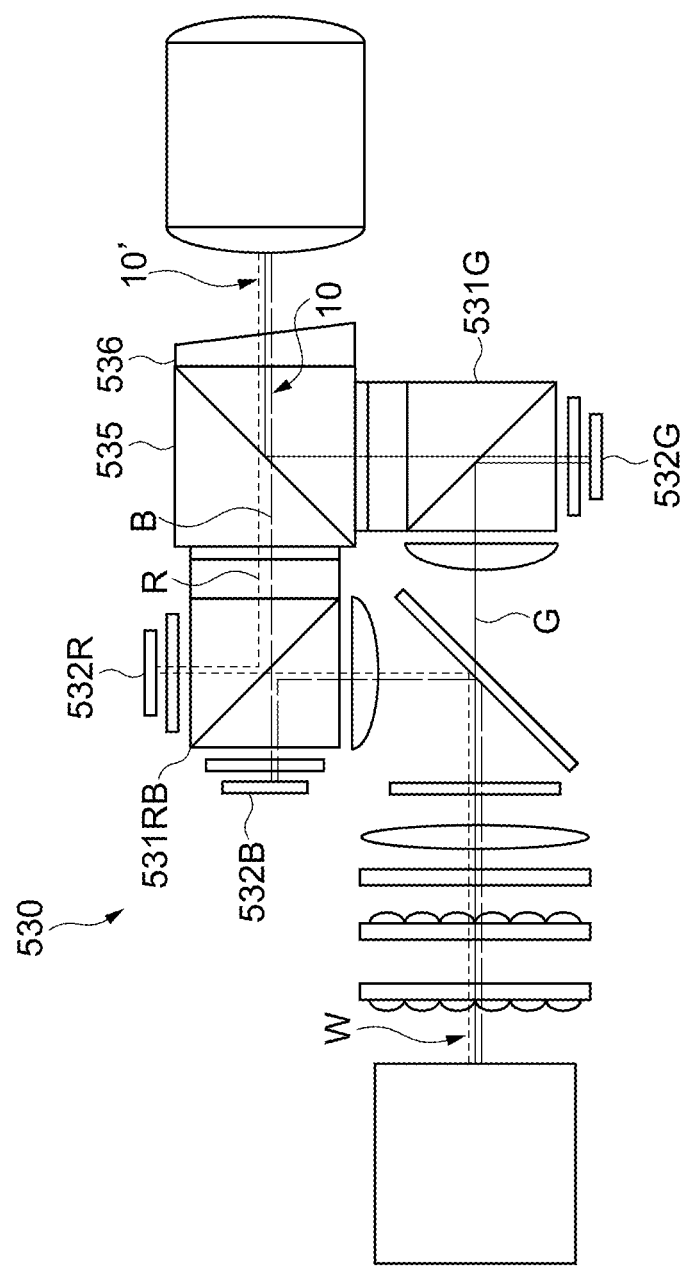
FIG. 18 is a schematic diagram showing another configuration example of the image generation unit.

FIG. 16 to FIG. 18 are each a schematic diagram showing another configuration example of the image generation unit. As in an image generation unit 330 shown in FIG. 16, another polarization element such as a prism-type beam splitter may be used as a reflective polarization element 331 (331R, 331G, 331B) instead of a wire grid polarizer. Further, the orientation in which a reflective light modulation element 332 (332R, 332G, 332B) is disposed is not limited, and may be appropriately designed.

As in an image generation unit 430 shown in FIG. 17, a transmission-type light modulation element 432 (432R, 432G, 432B) may be used. For example, a polarization plate or a compensation plate is disposed so as to sandwich the transmission-type light modulation element 432. In addition, an arbitrary configuration may be employed.

In an image generation unit 530 shown in FIG. 18, green image light G modulated by a reflective light modulation element 532G is reflected by a reflective polarization element 531G and enters a color combination prism 535. Red image light R modulated by a reflective light modulation element 532R and image light B modulated by a reflective light modulation element 532B are emitted along the same optical path by a reflective light modulation element 531RB, and enter the color combination prism 535.

Also in the configuration shown in FIG. 16 to FIG. 18, a polarization scrambler (336, 436, 536) is disposed on the optical path of the image light 10 (image light R, G, B). As a result, it is possible to sufficiently depolarize the polarization state of the image light 10, and emit the obtained light as the image light 10' in the unpolarized state. As a result, it is possible to display a high-quality image. It goes without saying that a suppression member may be disposed on a polarization scrambler.

As the light modulation element, in addition to the liquid crystal panel, an arbitrary device such as a digital micromirror device (DMD) may be used.

The configurations of the image display apparatus, the light source unit, the lighting optical system, the image generation unit, the projection optical system, the polarization scrambler, the suppression member, and the like described with reference to the drawings are merely one embodiment, and can be arbitrarily modified without departing from the essence of the present technology. That is, other arbitrary configurations for carrying out the present technology may be employed.

In the present disclosure, the concepts specifying the shape, size, positional relationship, state, and the like such as "central", "middle", "uniform", "equal", "same", "perpendicular", "parallel", "vertical", "symmetric", "extend" "axial direction", "rectangular parallelepiped shape", "curved surface shape", "curved shape", "curved shape", and "lens shape" are concepts including "substantially central", "substantially middle", "substantially uniform", "substantially equal", "substantially the same", "substantially perpendicular", "substantially parallel", "substantially vertical", "substantially symmetric", "substantially extend" "substantially axial direction", "substantially rectangular parallelepiped shape", "substantially curved surface shape", "substantially curved shape", "substantially curved shape", and "substantially lens shape".

For example, the error range with the "completely central", "completely middle", "completely uniform", "completely equal", "completely the same", "completely perpendicular", "completely parallel", "completely vertical", "completely symmetric", "completely extend" "completely axial direction", "completely axial direction", "completely rectangular parallelepiped shape", "completely curved surface shape", "completely curved shape", "completely curved shape", and "completely lens shape".

At least two of the features of the present technology described above can also be combined. In other words, various features described in the respective embodiments may be arbitrarily combined without distinguishing the embodiments. Further, the various effects described above are not limitative but are merely illustrative, and other effects may be provided.

Note that the present technology may also take the following configurations.

(1) An image display apparatus, including:
 a light emission unit that emits image light; and
 a polarization conversion element that has an incident surface, converts a polarization state of the image light that enters the incident surface, emits the converted light as image light in an unpolarized state, and is configured such that conversion properties of the polarization state are non-uniform in the incident surface.

(2) The image display apparatus according to (1), in which
 the polarization conversion element adds a phase difference to the image light that enters the incident surface and is configured such that the phase difference added to the image light is non-uniform in the incident surface.

(3) The image display apparatus according to (1) or (2), in which
 the polarization conversion element is configured such that a birefringence with respect to the image light is non-uniform in the incident surface.

(4) The image display apparatus according to any one of (1) to (3), in which
 the polarization conversion element has an emission surface that emits the image light in the unpolarized state and is configured such that a thickness from the incident surface to the emission surface in an optical axis direction of the image light is non-uniform in the incident surface.

(5) The image display apparatus according to any one of (1) to (4), in which
 the polarization conversion element is configured such that conversion properties of the polarization state change in a continuous manner along a predetermined direction in the incident surface.

(6) The image display apparatus according to (4), in which
 the emission surface is tilted along a predetermined direction with respect to the incident surface.

(7) The image display apparatus according to (5) or (6), in which
 the predetermined direction is a direction corresponding to an up-and-down direction or a right-and-left direction of an image formed by the image light.

(8) The image display apparatus according to (2), in which
 the polarization conversion element is configured such that a difference between a minimum phase difference and a maximum phase difference added to the image light is equal to or larger than ¼ of a reference wavelength of the image light.

(9) The image display apparatus according to (8), in which
the reference wavelength is a wavelength included in a blue wavelength band.

(10) The image display apparatus according to any one of (1) to (9), further including:
a suppression member that has a suppression incident surface and a suppression emission surface, the image light in the unpolarized state emitted from the polarization conversion element entering the suppression incident surface, the suppression emission surface emitting the image light in the unpolarized state that enters the suppression incident surface, in which
the suppression member is configured to be capable of emitting the image light from the suppression emission surface while suppressing a variation in an optical distance of the image light from the incident surface to the emission surface of the polarization conversion element.

(11) The image display apparatus according to (10), in which
the polarization conversion element has an emission surface that emits the image light in the unpolarized state, and
the suppression member is disposed such that the suppression incident surface comes into contact with the emission surface or the suppression member is disposed such that the suppression incident surface is close to the emission surface in parallel.

(12) The image display apparatus according to (10) or (11), in which
the suppression member is disposed such that the suppression emission surface is parallel to the incident surface.

(13) The image display apparatus according to any one of (10) to (12), in which
the suppression member is configured such that a distance from the incident surface to the suppression emission surface is uniform in the optical axis direction of the image light.

(14) The image display apparatus according to any one of (10) to (13), in which
the suppression member has a shape equal to that of the polarization conversion element.

(15) The image display apparatus according to any one of (10) to (14), in which
the suppression member is formed of a material having no optical anisotropy.

(16) The image display apparatus according to any one of (10) to (15), in which
a refractive index of the suppression member is specified on a basis of a refractive index of the polarization conversion element.

(17) The image display apparatus according to any one of (1) to (16), in which
the polarization conversion element is formed of a uniaxial crystal material or a uniaxial organic material.

(18) The image display apparatus according to any one of (1) to (17), further including
a projection unit that projects the image light in the unpolarized state emitted from the polarization conversion element, in which
the light emission unit includes a light modulation element that modulates incident light and emits the image light.

(19) An image display unit, including:
a polarization conversion element that has an incident surface, converts a polarization state of the image light that enters the incident surface, emits the converted light as image light in an unpolarized state, and is configured such that conversion properties of the polarization state are non-uniform in the incident surface.

(20) The image display unit according to (19), further including
a suppression member that has a suppression incident surface and a suppression emission surface, the image light in the unpolarized state emitted from the polarization conversion element entering the suppression incident surface, the suppression emission surface emitting the image light in the unpolarized state that enters the suppression incident surface, in which
the suppression member is configured to be capable of emitting the image light from the suppression emission surface while suppressing a variation in an optical distance of the image light from the incident surface to the emission surface of the polarization conversion element.

REFERENCE SIGNS LIST

C optical axis direction
S1 to S3 polarization property
10 image light
10' image light in an unpolarized state
20, 30a to 34a incident surface
21, 30b to 34b emission surface
30 to 34 polarization scrambler
40, 50a to 53a suppression incident surface
41, 50b to 53b suppression emission surface
50 to 53 suppression member
54 adhesive
55 air gap
100, 200 image display apparatus
110 lighting optical system
130, 330, 430, 530 image generation unit
135 color combination prism
136 polarization scrambler
137 suppression member
140 projection optical system

The invention claimed is:
1. An image display apparatus, comprising:
a light emission unit that emits image light; and
a polarization conversion element that has an incident surface, converts a polarization state of the image light that enters the incident surface, emits the converted light as image light in an unpolarized state, and is configured such that conversion properties of the polarization state are non-uniform in the incident surface.

2. The image display apparatus according to claim 1, wherein
the polarization conversion element adds a phase difference to the image light that enters the incident surface and is configured such that the phase difference added to the image light is non-uniform in the incident surface.

3. The image display apparatus according to claim 2, wherein
the polarization conversion element is configured such that a difference between a minimum phase difference and a maximum phase difference added to the image light is equal to or larger than ¼ of a reference wavelength of the image light.

4. The image display apparatus according to claim 3, wherein
the reference wavelength is a wavelength included in a blue wavelength band.

5. The image display apparatus according to claim 1, wherein
the polarization conversion element is configured such that a birefringence with respect to the image light is non-uniform in the incident surface.

6. The image display apparatus according to claim 1, wherein
the polarization conversion element has an emission surface that emits the image light in the unpolarized state and is configured such that a thickness from the incident surface to the emission surface in an optical axis direction of the image light is non-uniform in the incident surface.

7. The image display apparatus according to claim 6, wherein
the emission surface is tilted along a predetermined direction with respect to the incident surface.

8. The image display apparatus according to claim 1, wherein
the polarization conversion element is configured such that conversion properties of the polarization state change in a continuous manner along a predetermined direction in the incident surface.

9. The image display apparatus according to claim 8, wherein
the predetermined direction is a direction corresponding to an up-and-down direction or a right-and-left direction of an image formed by the image light.

10. The image display apparatus according to claim 1, further comprising:
a suppression member that has a suppression incident surface and a suppression emission surface, the image light in the unpolarized state emitted from the polarization conversion element entering the suppression incident surface, the suppression emission surface emitting the image light in the unpolarized state that enters the suppression incident surface, wherein
the suppression member is configured to be capable of emitting the image light from the suppression emission surface while suppressing a variation in an optical distance of the image light from the incident surface to the emission surface of the polarization conversion element.

11. The image display apparatus according to claim 10, wherein
the polarization conversion element has an emission surface that emits the image light in the unpolarized state, and
the suppression member is disposed such that the suppression incident surface comes into contact with the emission surface or the suppression member is disposed such that the suppression incident surface is close to the emission surface in parallel.

12. The image display apparatus according to claim 10, wherein
the suppression member is disposed such that the suppression emission surface is parallel to the incident surface.

13. The image display apparatus according to claim 10, wherein
the suppression member is configured such that a distance from the incident surface to the suppression emission surface is uniform in the optical axis direction of the image light.

14. The image display apparatus according to claim 10, wherein
the suppression member has a shape equal to that of the polarization conversion element.

15. The image display apparatus according to claim 10, wherein
the suppression member is formed of a material having no optical anisotropy.

16. The image display apparatus according to claim 10, wherein
a refractive index of the suppression member is specified on a basis of a refractive index of the polarization conversion element.

17. The image display apparatus according to claim 1, wherein
the polarization conversion element is formed of a uniaxial crystal material or a uniaxial organic material.

18. The image display apparatus according to claim 1, further comprising
a projection unit that projects the image light in the unpolarized state emitted from the polarization conversion element, wherein
the light emission unit includes a light modulation element that modulates incident light and emits the image light.

19. An image display unit, comprising:
a polarization conversion element that has an incident surface, converts a polarization state of the image light that enters the incident surface, emits the converted light as image light in an unpolarized state, and is configured such that conversion properties of the polarization state are non-uniform in the incident surface.

20. The image display unit according to claim 19, further comprising
a suppression member that has a suppression incident surface and a suppression emission surface, the image light in the unpolarized state emitted from the polarization conversion element entering the suppression incident surface, the suppression emission surface emitting the image light in the unpolarized state that enters the suppression incident surface, wherein
the suppression member is configured to be capable of emitting the image light from the suppression emission surface while suppressing a variation in an optical distance of the image light from the incident surface to the emission surface of the polarization conversion element.

* * * * *